United States Patent [19]
Roberts

[11] Patent Number: 6,128,421
[45] Date of Patent: Oct. 3, 2000

[54] ELECTRO-OPTICAL PHASED ARRAY BEAM MODULATOR

[76] Inventor: Rodger Allen Roberts, 1 Grange Avenue, Canterbury, Victoria, 3126, Australia

[21] Appl. No.: 09/255,514

[22] Filed: Feb. 22, 1999

[51] Int. Cl.$^7$ .................................................. G02F 1/035
[52] U.S. Cl. .......................... 385/3; 385/1; 385/2; 385/8; 385/147; 359/223; 342/368
[58] Field of Search .................................... 385/3, 8, 2, 4, 385/9, 37, 14, 40, 1, 147; 359/223, 224, 291, 251, 298, 846; 372/44, 46; 342/368, 158, 372

[56] References Cited

U.S. PATENT DOCUMENTS

| | | |
|---|---|---|
| 3,711,262 | 1/1973 | Keck et al. . |
| 4,360,921 | 11/1982 | Seifres et al. . |
| 4,764,738 | 8/1988 | Fried ............................................ 385/3 |
| 5,543,805 | 8/1996 | Thaniyavarn . |
| 5,751,248 | 5/1998 | Thaniyavarn . |
| 5,777,312 | 7/1998 | Hanson . |

*Primary Examiner*—Phan T. H. Palmer

[57] ABSTRACT

An electro-optical phased array beam modulator is an apparatus for modulating a polarized coherent light source to produce a directionally controlled output beam which can be continuously steered in two separate dimensions by two independently controlled input control signals. It includes a waveguide bundle comprising a multiplicity of similar phase modulator elements with an input end into which polarized coherent light is received and an emitting end on which is located an emitting array from which phase shifted light emerges. It includes an electronic control circuit to convert two input control signals into four corner voltages, which are applied across a resistor grid array and then linearly distributed to the individual phase modulator elements by means of column and row resistor elements, so as to produce a planar voltage distribution pattern of transverse voltages applied across the individual phase modulator elements, corresponding to the required direction of the output beam defined by the two input control signals. A phase shift is induced in the light passing through each phase modulator element proportional to the magnitude of such transverse voltage and the length over which it is applied. Constructive and destructive interference of the light occurs as it emerges from the emitting elements of the emitting array, forming a wave front, the orientation of which is dependent upon the combined effect of the phase shift pattern induced in all the phase modulator elements by such planar voltage distribution pattern.

53 Claims, 12 Drawing Sheets

FIG. 1 - Prior Art

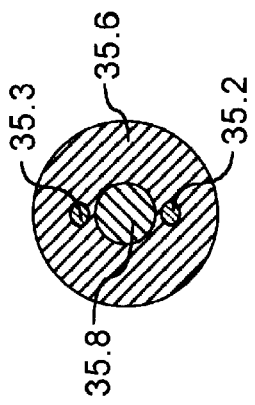
FIG. 7
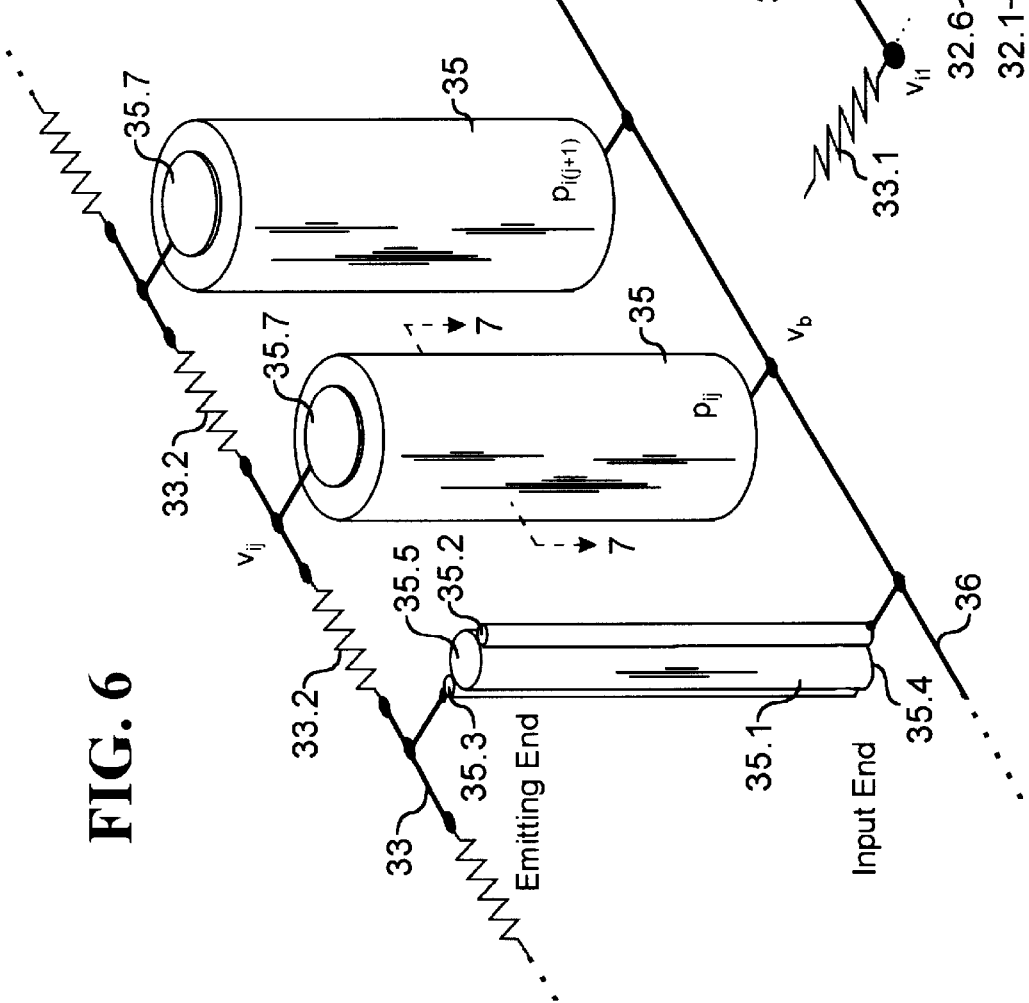
FIG. 6
FIG. 8

FIG. 14

| Scan Number | 1 | | | | | 2 | | | | | 3 | | | | |
|---|---|---|---|---|---|---|---|---|---|---|---|---|---|---|---|
| Input Control Signals - Volts | | | | | | | | | | | | | | | |
| $S_y$ | 5 | 5 | 5 | 5 | 5 | 3 | 3 | 3 | 3 | 3 | 1 | 1 | 1 | 1 | 1 |
| $S_x$ | 1 | 2 | 3 | 4 | 5 | 1 | 2 | 3 | 4 | 5 | 1 | 2 | 3 | 4 | 5 |
| Intermediate Signals - Volts | | | | | | | | | | | | | | | |
| $k_{sy}$ | 1.50 | 1.50 | 0.00 | 0.00 | 0.00 | 0.00 | 0.00 | 0.00 | 0.00 | 0.00 | -1.50 | -1.50 | -1.50 | -1.50 | -1.50 |
| $k_{sx}$ | -1.50 | -0.75 | 0.00 | 0.75 | 1.50 | -1.50 | -0.75 | 0.00 | 0.75 | 1.50 | -1.50 | -0.75 | 0.00 | 0.75 | 1.50 |
| Logic Output States | | | | | | | | | | | | | | | |
| $C_y$ | 1 | 1 | 1 | 1 | 1 | 1 | 1 | 1 | 1 | 1 | 0 | 0 | 0 | 0 | 0 |
| $C_x$ | 0 | 0 | 1 | 1 | 1 | 0 | 0 | 1 | 1 | 1 | 0 | 0 | 1 | 1 | 1 |
| Corner Voltages - Volts | | | | | | | | | | | | | | | |
| $v_{11}$ | 1.50 | 1.50 | 0.00 | 0.00 | 0.00 | 1.50 | 1.50 | 0.00 | 0.00 | 0.00 | 3.00 | 3.00 | 1.50 | 1.50 | 1.50 |
| $v_{1n}$ | 0.00 | 0.75 | 0.00 | 0.75 | 1.50 | 0.00 | 0.75 | 0.00 | 0.75 | 1.50 | 1.50 | 2.25 | 1.50 | 2.25 | 3.00 |
| $v_{n1}$ | 3.00 | 3.00 | 1.50 | 1.50 | 1.50 | 1.50 | 1.50 | 0.00 | 0.00 | 0.00 | 1.50 | 1.50 | 0.00 | 0.00 | 0.00 |
| $v_{nn}$ | 1.50 | 2.25 | 1.50 | 2.25 | 3.00 | 0.00 | 0.75 | 0.00 | 0.75 | 1.50 | 0.00 | 0.75 | 0.00 | 0.75 | 1.50 |
| Illuminated Spot Coordinates % | | | | | | | | | | | | | | | |
| x | -100 | -50 | 0 | 50 | 100 | -100 | -50 | 0 | 50 | 100 | -100 | -50 | 0 | 50 | 100 |
| y | 100 | 100 | 100 | 100 | 100 | 0 | 0 | 0 | 0 | 0 | -100 | -100 | -100 | -100 | -100 |

ELECTRO-OPTICAL PHASED ARRAY BEAM MODULATOR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates generally to beam steering of coherent light and more particularly to apparatus utilizing electro-optical phase modulation of light within waveguide bundles, optical phased array emitters, electronic control circuits, and resistor grid arrays for voltage distribution.

Laser beams are used in many product applications such as laser printers, scanners, bar code readers, projectors. CD players and CD-ROM readers. Many of these devices involve the relative movement of a laser beam across a surface which is achieved by mechanical means. Typically this takes the form of movement of the laser device itself, the deflection of the beam by means of movable mirrors and/or prisms, or movement of the surface on to which the beam is projected. Historically, machines using mechanically moving parts have tended to be more expensive, less reliable and slower than solid state devices which achieve the same results without moving parts. In general terms, this invention is intended as a solid state alternative to the mechanical components currently used to control the direction of a laser beam, in devices such as scanners, laser printers, bar code readers, laser video displays, laser video projectors and potentially in new types of devices which require a controlled laser beam projection capability.

For a long time phased array radar systems which operate in the microwave range of the electromagnetic spectrum have used beams of electromagnetic radiation which are steered without movable antennae. The key elements constituting the basic operating principles of beam steering by means of a phased array of radiating antenna elements are part of the prior art and are shown in FIG. 1. Over the last two decades or so, there have been a number of inventions which have attempted to apply these operating principles to optical phased array systems. Most of these systems are based on electro-optical phase shifters in which a voltage is applied across an electro-optical waveguide to induce a phase shift proportional to the length of the waveguide and the applied voltage.

None of these inventions so far has been able to displace the current dominance of mechanical systems in commercial optical devices requiring steerable laser beams, because a number of deficiencies remain to be overcome. Deficiencies in the prior art relating to optical phased arrays are summarized as follows:

Fabrication of the components to the required tolerances is difficult because the small wavelength of light necessitates correspondingly small components.

Photolithographic technology for fabricating small scale components has tended to focus on linear electro-optical arrays which can be steered only in one dimension.

Fabrication of electro-optical waveguides with two dimensional emitting arrays has been difficult.

The number of phase shifting elements in the array has been limited by the complexity of electrically connecting a large number of phase shifting elements to a control system, which in turn has resulted in relatively few emitting elements and hence wide beams with limited resolving power and beam intensity.

In some cases, the use of a limited number of discrete control voltage levels in order to simplify the electrical controls and connections for a two dimensional array has restricted the ability to steer the beam continuously.

The control systems have tended to be complex.

References to specific documents containing information related to this invention are as follows:

| | | | |
|---|---|---|---|
| U.S. Pat. No. 4,360,921 | Donald R. Scifres et al. | 11/23/1982 | Monolithic Laser Scanning Device |
| U.S. Pat. No. 4,764,738 | David L. Fried | 8/16/1988 | Agile Beam Control of Optical Phased Array |
| U.S. Pat. No. 5,777,312 | George E. Hanson | 7/7/1998 | Phased Array Laser Scanner |
| U.S. Pat. No. 5,751,248 | Suwat Thaniyavarn | 5/12/1998 | Phased Array Beam Controller Using Integrated Electro-Optic Circuits |
| U.S. Pat. No. 5,543,805 | Suwat Thaniyavarn | 8/6/1996 | Phased Array Beam Controller Using Integrated Electro-Optic Circuits |
| U.S. Pat. No. 3,711,262 | Donald B. Keck et al. | 1/16/1973 | Method of Producing Optical Waveguide Fibers |

EUGENE HECHT. Optics, 2nd Edition. 1987, Addison-Wesley, ISBN 0-201-11611-1

FERNANDO AGULLO-LOPEZ, JOSE MANUEL CABRERA, FERNANDO AGULLO-RUEDA, Electrooptics, Phenomena, Materials and Applications, 1994, Academic Press, ISBN 0-12-044512-3

L. J. GIACOLETTO (Editor), Electronics Designers' Handbook. 2nd Edition, 1977, McGraw-Hill, ISBN 0-07-023149-4
Section 18: Wave Shaping Circuits
Section 26 Radar and Navigational Systems JACOB MILLMAN. CHRISTOS HALKIAS, Integrated Electronics: Analog and Digital Circuits and Systems, International Student Edition, 1972, McGraw-Hill Kogakusha, Library of Congress Catalog Card Number 79-172657

DANIEL LAPEDES (Editor), McGraw-Hill Dictionary of Scientific and Technical Terms. 2nd Edition, 1978, McGraw-Hill, ISBN 0-07-045258-X

BRIEF SUMMARY OF THE INVENTION

The primary object of this invention is to create a better apparatus for controlling the direction of a projected light beam. Additional objects of this invention are:

to create a waveguide bundle of phase modulator elements terminating in a two dimensional emitting array which is easier to fabricate than alternatives using traditional photolithographic techniques;

to produce an output beam which can be steered independently in two separate dimensions by means of two respective input control signals;

to produce an output beam which can be steered continuously over its entire operating range;

to create simplified connections between the electronic control circuit and the phase modulator elements by the use of a resistor grid array and a base bias grid to distribute transverse voltages to the phase modulator elements;

to create a simplified electronic control circuit to apply variable control voltages across the phase modulator elements in the array;

to create a basic apparatus which easily lends itself to scaling up into a very large array; and to produce a narrow output beam from a large number of emitting elements.

An electro-optical phased array beam modulator is an apparatus for modulating a polarized coherent light source to produce a directionally controlled output beam which can be continuously steered in two separate dimensions by two independently controlled input control signals. The apparatus includes the means for receiving, at the input end of a waveguide bundle, a source of polarized coherent light, which light arrives at all points across such input end at substantially the same phase angle. The waveguide bundle comprises a multiplicity of substantially identical phase modulator elements embedded in a matrix structure and terminating in a regular two dimensional emitting array. Each phase modulator element in such waveguide bundle comprises an input port at the input end into which the polarized coherent light is channeled; a waveguide; a control voltage electrode and a base voltage electrode running along most of the length of such waveguide, by means of which a transverse voltage can be applied individually across each such waveguide; and an emitting element at the emitting end of the waveguide from which the phase shifted light emerges. Also included is an electronic control circuit to convert the two input control signals into four corner voltages consisting of three analog control voltages and a reference control voltage. The corner voltages are applied as a group across a resistor grid array incorporated into the waveguide bundle and in turn are distributed linearly along column and row resistor elements of the resistor grid array. The electronic control circuit also provides a base bias voltage which is applied to the base bias grid.

In order to steer the output beam the electronic control circuit converts the two input control signals into the corner voltages, which are applied across the resistor grid array. The resulting linearly distributed voltage gradients within the resistor grid array are applied individually to the control voltage electrodes of each phase modulator element by means of connections linking such control voltage electrodes to the resistor grid array such that a separate transverse voltage is applied across each phase modulator element. The pattern of such transverse voltages with respect their respective emitting elements in the emitting array, is a planar voltage distribution pattern which is directly related to such corner voltages, and hence is directly related to the two input control signals. The transverse voltage applied across any phase modulator element causes a phase shift in the light passing through such phase modulator element proportional to the magnitude of such applied transverse voltage and the effective length over which it is applied. Depending on the magnitude of the two input control signals, the phase angle of the light emerging from each emitting element in the emitting array gradually changes across the array from one emitting element to the next, forming a phase shift pattern in the radiation emerging from the emitting array, which is directly related to the planar voltage distribution pattern applied across the resistor grid array by the corner voltages.

Constructive and destructive interference of the radiation occurs as it emerges from each of the emitting elements of the emitting array, forming a wave front, the orientation of which is dependent upon the combined effects of the phase shift pattern. Because the number of emitting elements is large, the emergent radiation is concentrated into a narrow output beam, the direction of which is perpendicular to the wave front. The x and y coordinates of the illuminated spot formed on a projection plane by such output beam, are directly related to the value of the input control signals. The direction of the output beam therefore may be varied continuously over its operating range by appropriate adjustments to the input control signals.

Within the prior art there are a number of devices which utilize the phased array operating principle to control the direction of a coherent light beam by means of electronic signals. This invention, although it is based on similar operating principles, differs in the following key respects:

An existing monolithic laser scanning device contains a one dimensional emitting array which limits scanning to one dimension, whereas this invention has a two dimensional emitting array which can scan in two dimensions.

Another type of phased array laser scanner which is part of the prior art uses a phase delay in the laser output between adjacent laser devices, whereas this invention uses phase modulator elements rather than the laser devices themselves to induce the phase shift in the light.

Also part of the prior art is a beam control in two dimensions for an optical phased array, which is fabricated from two three-dimensional units each consisting of a number of plates stacked adjacent to one another and positioned at 90 degrees relative to one another, one unit to achieve directional control in one dimension and the other unit to achieve directional control in the perpendicular dimension. In contrast, this invention has an integrated waveguide bundle, without the need for a 90 degree transposition in the middle of the waveguide.

The prior art includes a beam controlled by a series of binary reverse polarity voltage distributions. This invention on the other hand, utilizes a reference control voltage and three analog control voltages which can be continuously varied and distributed across the array in a predetermined pattern by a control and distribution circuit consisting of an electronic control circuit and a resistor grid array.

The above noted differences between this invention and the prior art constitute a new apparatus. Such new apparatus permits continuous control of the output beam in two independent dimensions, utilizing simplified means for producing and distributing the individual signals to control the direction of the output beam. In addition each of two sub-combinations of said apparatus namely a type of waveguide bundle and a type of control and distribution circuit to effect phase control of the emitted light by means of two input control signals, constitutes a new apparatus.

The drawings constitute a part of this specification and include preferred embodiments of the invention, which may be embodied in various other forms. Some aspects of the invention shown in the drawings may be exaggerated or enlarged to facilitate understanding.

BRIEF DESCRIPTION OF THE SEVERAL VIEWS OF THE DRAWINGS

FIG. 6 Is a conceptual view of a preferred embodiment of adjacent phase modulator elements.

FIG. 7 Is a cross-sectional view taken along a line 7—7 in FIG. 6, showing a preferred embodiment of a phase modulator element.

FIG. 8 Is a perspective view of a planar phase modulator element, which is an alternative embodiment of a phase modulator element.

FIG. 14 Is a tabulation of a sampling of input control signals, intermediate signals, logic output states, corner voltages and illuminated spot coordinates for a series of three scans of the two input control signals.

DETAILED DESCRIPTION OF THE INVENTION

For clarity of understanding, the concept underlying the claimed invention will be explained firstly with reference to FIG. 1, by describing the basic operating principle of beam steering using phased arrays which is part of the prior art: secondly with reference to FIG. 2, by describing the overall combination comprising the invention, incorporating by reference descriptions of sub-components; and then lastly by describing the sub-components of the invention with reference to the remaining drawings.

The nomenclature used throughout for defining rectangular arrays and elements within such arrays, is substantially the same as that commonly used in linear algebra, in which any rectangular array can be represented by an array of m rows and n columns, the size (or order) of such array being defined as m×n. A square array is an array in which the number of rows equals the number of columns. A one dimensional array is an array with only one row or one column, such an array also being referred to as a linear array. A generic descriptor for any element a, in the array, is $a_{ij}$, where the subscript i designates the row and j designates the column in which $a_{ij}$ is located. The row and column designations of any such element are determined by the row and column designations of the emitting element with which it is associated. All sub-components of an element have the same row and column designations as the element itself.

Figure 1:
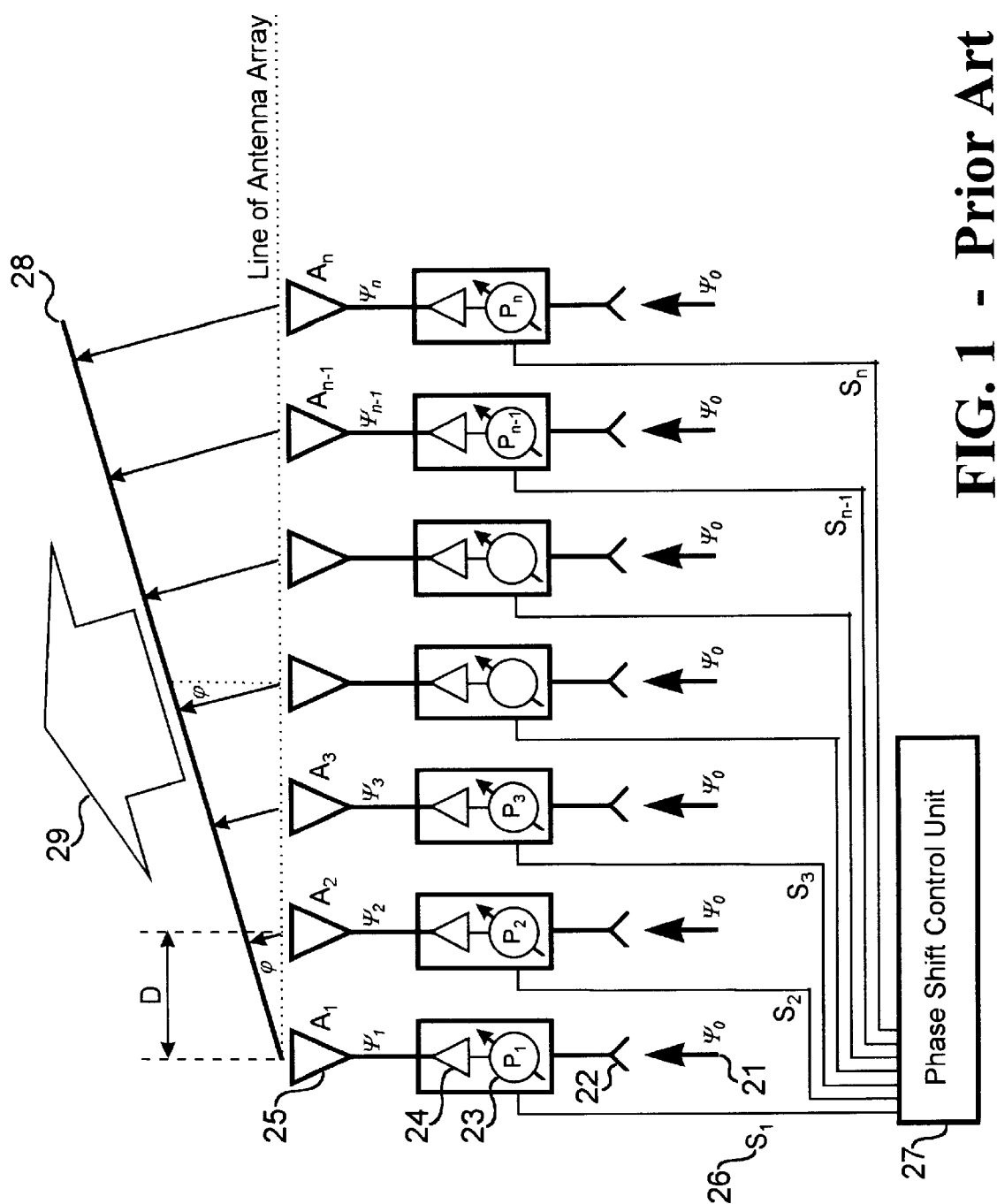
FIG. 1 Is a graphic illustration of the basic operating principles of beam steering by means of phase shifting in a microwave phased array, which is part of the prior art.

Referring to FIG. 1, there is shown a graphic illustration of the basic operating principles of beam steering by means of phase shifting in a microwave phased array, which is part of the prior art. This illustrative example of the prior art includes a total number n of identical antenna elements 25, designated $A_1$ through $A_n$, arranged into a regular one dimensional array and spaced a distance. D, apart from one another. For simplicity, only a one dimensional array of antenna elements has been shown. A source of coherent electromagnetic radiation 21, in the microwave range, with an initial phase angle of $\Psi_0$, feeds separately into the input port 22 of each phase shifter element 23, each of which feeds into its own amplifier 24, and terminates in its own antenna element. A phase shift control unit 27 provides separate phase shift control signals 26, designated $S_1$ through $S_n$, to each phase shifter element, respectively designated $P_1$ through $P_n$. Each of the phase shifter elements causes a change or shift in the phase angle of the microwave radiation passing through it, dependent upon its respective phase shift control signal, so that the phase angles of the radiation arriving at the antenna elements become, $\Psi_1, \Psi_2, \Psi_3, \ldots \Psi_n$. The phase angle difference between the phase angles of the radiation emerging from adjacent phase shifter elements is made to vary by a constant amount, $\Delta\Psi$, by appropriate differences in the phase shift control signals. This results in a linear progression in the phase angles across the array, with the radiation from each antenna element lagging behind the corresponding radiation from the next antenna element on the right, by such amount $\Delta\Psi$.

Mathematically : $\Psi_2-\Psi_1=\Psi_3-\Psi_2=\Psi_n-\Psi_{n-1}=\Delta\Psi$

As the radiation emerges from the antenna elements, constructive and destructive interference occurs, as a result of the superposition of the emerging radiation from the various antenna elements. Such superposition of radiation creates a series of outwardly moving wave fronts, each defined by a line joining points of in-phase radiation. Such wave fronts move in a direction perpendicular to the line of the wave front. One such wave front 28, is shown at an angle φ to the line of the antenna array, such that:

$$\phi=\arcsin(\Delta\Psi \cdot \lambda/2\pi D)$$

Where:

φ=Angle between the wave front and line of antenna array

=Angle between antenna beam direction and a line perpendicular to line of antenna array $\Delta\Psi$=Phase angle difference between radiation emerging from adjacent antenna elements λ=The wavelength of the radiation D=The distance between antenna elements Hence the direction of the wave front may be controlled by varying $\Delta\Psi$, by means of appropriate differences in the phase shift control signals.

Another operating characteristic of phased array systems is that the emerging radiation tends to be concentrated into a central lobe of maximum intensity, referred to as the antenna beam 29, the width of which is inversely related to the number of antenna elements. The principle of reducing the width of the antenna beam by utilizing a large number of antenna elements, forms part of the basic operating principles and is part of the prior art.

The operating principles for a two dimensional array, which can move a beam in two dimensions, are similar to those described above for a linear array.

Figure 2:
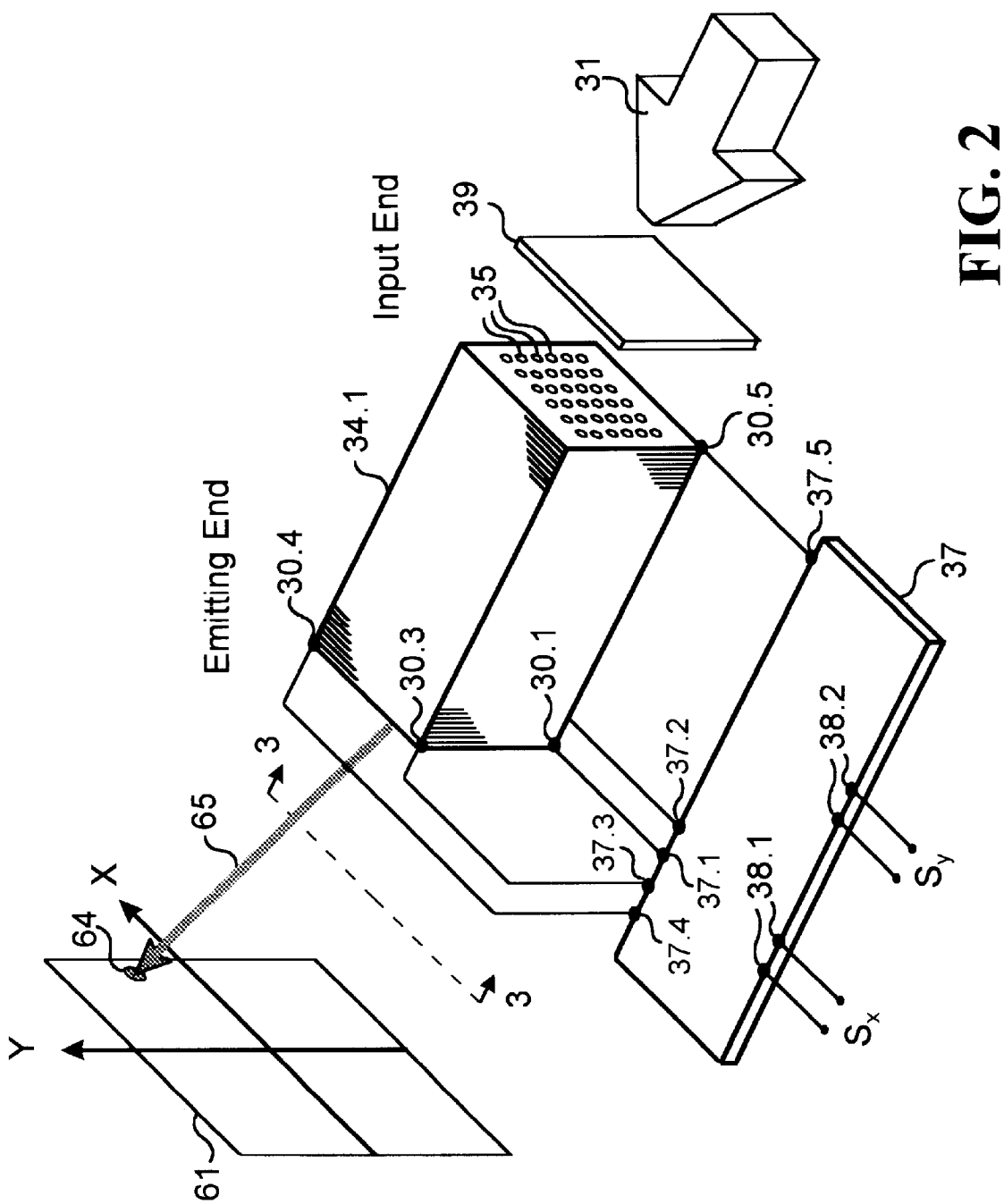
FIG. 2 Is a conceptual view showing primary elements comprising this invention in a preferred embodiment.

Referring to FIG. 2, there is shown a conceptual view of primary elements comprising this invention in a preferred embodiment. In this preferred embodiment, the waveguide bundle 34.1 (as further described with reference to FIG. 5) comprises a multiplicity of substantially identical phase modulator elements 35 (as further described with reference to FIG. 6) all of which are embedded in a three-dimensional matrix structure and terminate in a regular two dimensional emitting array at the emitting end of the waveguide bundle. The part of the waveguide bundle into which light is channeled is referred to as the input end, and the end from which the light emerges is referred to as the emitting end. A coherent light source which is substantially polarized 31, is received into the individual input ports of the waveguides of the phase modulator elements at the input end of the waveguide bundle. In a preferred embodiment, the phase angle of all the light entering such input end is at substantially the same phase angle across the entire input end. It is noted that in alternative embodiments, the phase angle of the light entering the input end may vary across such input end. Sources of polarized coherent light and the means to receive such light into waveguides are well known in the prior art. Such light source may be a laser diode or a series of phased locked laser diodes or any other convenient laser source. After entering the input port of the waveguide, the light travels through such waveguide to the emitting element at the emitting end, from which it emerges (as further described with reference to FIG. 7). Such emitting elements are positioned so as to form an emitting array. A preferred embodiment of such an emitting array is a square emitting array (as further described with reference to FIG. 3). Alternative embodiments may use other configurations for the emitting array, such as an offset square emitting array (as further described with reference to FIG. 4) or a rectangular emitting array in which the number of rows is different from the number of columns. Other variations such as two dimensional emitting arrays which approximate other shapes, including hexagonal or circular approximations, are possible. Another alternative embodiment is a linear emitting array of longitudinal emitting elements (as further described with reference to FIG. 8).

In a preferred embodiment, the intensity of light is substantially uniform across the input end of the waveguide bundle. In an alternative embodiment, the light is attenuated in a predetermined manner or masked across certain regions of such input end of the waveguide bundle in order to achieve a particular form or shape of the output beam 65. This may be achieved by means of an attenuating filter 39, placed between the input end of the waveguide bundle and the coherent light source, which attenuates the light passing through it by differing amounts across its surface according to a predetermined attenuation pattern. Alternatively, such attenuating filter may be placed at the emitting end of the waveguide bundle. The effective shape of the emitting array may be modified by means of such attenuating filter, thereby effectively transforming the emitting array into other desired emitting array shapes which could include hexagonal or circular shapes.

Two input control signals, the first of which is referred to as $S_x$ and the second of which is referred to as $S_y$, are fed into the electronic control circuit 37, (as further described with reference to FIG. 12), through signal input terminals 38.1 and 38.2 respectively. In a preferred embodiment, such electronic control circuit is physically separate from the waveguide bundle. In an alternative embodiment, the electronic control circuit may be fabricated as an integrated circuit on to the waveguide assembly (as further described with reference to FIG. 5). In a preferred embodiment, the input control signals take the form of voltage signals which vary from zero volts to a maximum voltage determined by the operating limits of the electronic control circuit. The electronic control circuit provides a reference control voltage, designated $v_{11}$, which is the first corner voltage and which in a preferred embodiment is equal to zero volts and in an alternative embodiment may be one of three voltages, depending on the value of the input control signals (as further described with reference to FIG. 12 and FIG. 13). The electronic control circuit converts the two input control signals into an additional three analog control voltages, individually referred to as the second, third and fourth corner voltages and designated $V_{1n}$, $V_{n1}$ and $v_{nn}$ respectively, such three analog control voltages and reference control voltage being collectively referred to as the corner voltages. The corner voltages $v_{11}$, $v_{1n}$, $v_{n1}$ and $v_{nn}$ are fed through the circuit terminals 37.1, 37.2, 37.3 and 37.4 to the resistor grid array's corner voltage terminals, which are designated 30.1, 30.2, 30.3 and 30.4 respectively (as further described with reference to FIG. 9). The electronic control circuit also provides the base bias voltage, $v_b$, which is applied through circuit terminal 37.5 to the base bias terminal 30.5 of the base bias grid. In a preferred embodiment of the invention, the base bias voltage, $v_b$, is electrically grounded to the ground point of the electronic control circuit, resulting in $v_b$ being equal to zero volts.

The corner voltages are applied as a group across the corner voltage terminals and in turn are distributed individually to each of the phase modulator elements by means of the resistor grid array incorporated into the waveguide bundle (as further described with reference to FIG. 5, FIG. 6 and FIG. 9), in such a way that the transverse voltage applied individually to each phase modulator element varies according to a linear progression across the array. The resulting pattern of such transverse voltages as measured across the emitting array, is a planar voltage distribution pattern (as further described by way of an example with reference to FIG. 15). The light passing through each of the phase modulator elements undergoes a phase shift proportional to the transverse voltage applied across such phase modulator element and the effective length over which it is applied. The light emerging from all the emitting elements of all the phase modulator elements is phase shifted according to the planar voltage distribution pattern applied across the entire array. Such phase shifted light emerging from the emitting array produces the output beam of light, which points in a particular direction determined by the input control signals in accordance with the basic operating principles of beam steering (as further described with reference to FIG. 1). The electronic control circuit, the resistor grid array, the base bias grid and associated internal electrical connections are collectively referred to as the control and distribution circuit.

The direction of the output beam may be controlled continuously over its operating range by appropriate adjustments to the input control signals $S_x$ and $S_y$. The coordinates of the illuminated spot 64 on the projection plane 61 on to which the output beam projects, are directly related to the value of the input control signals $S_x$ and $S_y$ respectively (as further explained with reference to FIG. 14 and FIG. 16).

A special case of the invention occurs when steering of the output beam in only one dimension is required. An option for achieving this using a preferred embodiment of the invention, is to fix one of the two input control signals at the required value and vary the other input control signal. Another option is an alternative embodiment specifically adapted for steering the output beam in only one dimension by means of a control and distribution circuit specifically adapted for such purpose as further described with reference to FIG. 10 and FIG. 12.

Figure 3:
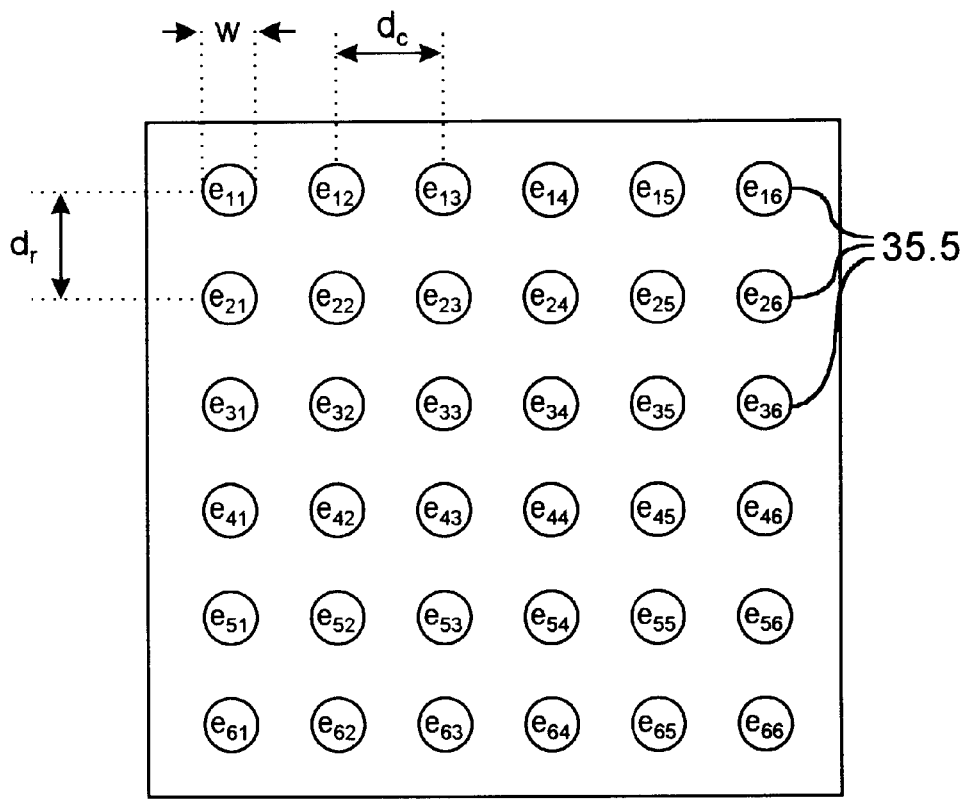
FIG. 3 Is an end view of the emitting end of the waveguide bundle as viewed from 3—3 in FIG. 2, showing a square emitting array, which is a preferred embodiment of the emitting array.

Referring to FIG. 3, there is shown an end view of the emitting end of the waveguide bundle as viewed from 3—3 in FIG. 2, showing a square emitting array, which is a preferred embodiment of the emitting array, with the number of rows, n, being equal to the number of columns, which is also equal to n. In this example of a preferred embodiment, n is equal to six, resulting in thirty six emitting elements 35.5 of substantially circular cross section, each of which has been given its own designation, ranging from $e_{11}$ to $e_{66}$. It is noted that the size of the array may be increased by increasing the number of emitting elements. In this preferred embodiment, the emitting elements are of diameter w, which is made approximately equal to the wavelength, $\lambda$, of the light intended to be used in the device. In this preferred embodiment, the distance, $d_c$, between the center points of emitting elements in adjacent columns, is essentially equal to the distance, $d_r$, between the center points of emitting elements in adjacent rows, and this distance is given the designation d. It is noted that $d_c$ is not necessarily equal to $d_r$ in alternative embodiments. Although it is desirable to keep $d_c$ and $d_r$ to a minimum in order to increase the scanning angle of the invention, practical considerations limit this objective. In a preferred embodiment, d is made approximately equal to $2\lambda$. It is noted that in alternative embodiments, the dimensions w and d may be considerably larger than $\lambda$ and $2\lambda$ respectively. Alternative embodiments of the emitting array, such as that described with reference to FIG. 4, are possible.

Figure 4:
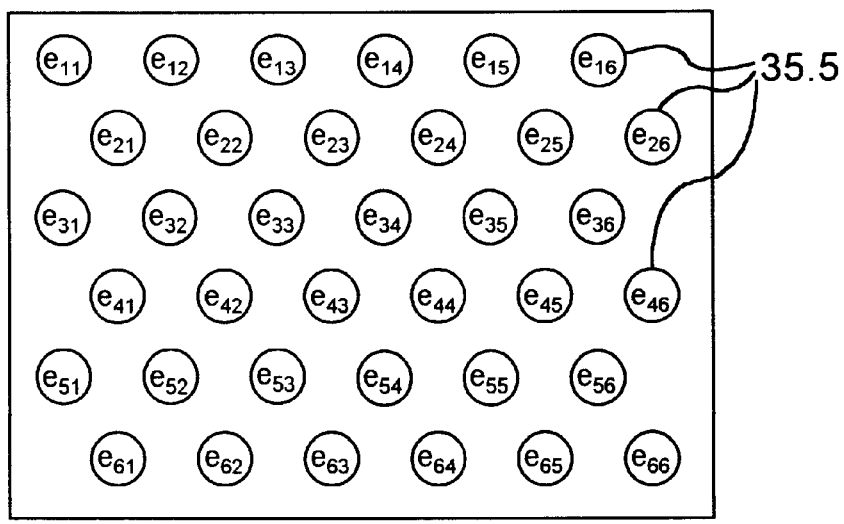
FIG. 4 Is an end view of the emitting end of the waveguide bundle as viewed from 3—3 in FIG. 2, showing an offset square emitting array, which is an alternative embodiment of the emitting array.

Referring to FIG. 4, there is shown an end view of the emitting end of the waveguide bundle as viewed from 3—3 in FIG. 2, showing an offset square emitting array, which is an alternative embodiment of the emitting array. In this alternative embodiment, emitting elements in any row are spatially offset by a distance approximately halfway between the center points of the emitting elements in adjacent rows as shown. This alternative embodiment of the emitting array results in a slightly higher packing density of phase modulator elements than is achieved by the embodiment described with reference to FIG. 3.

Figure 5:
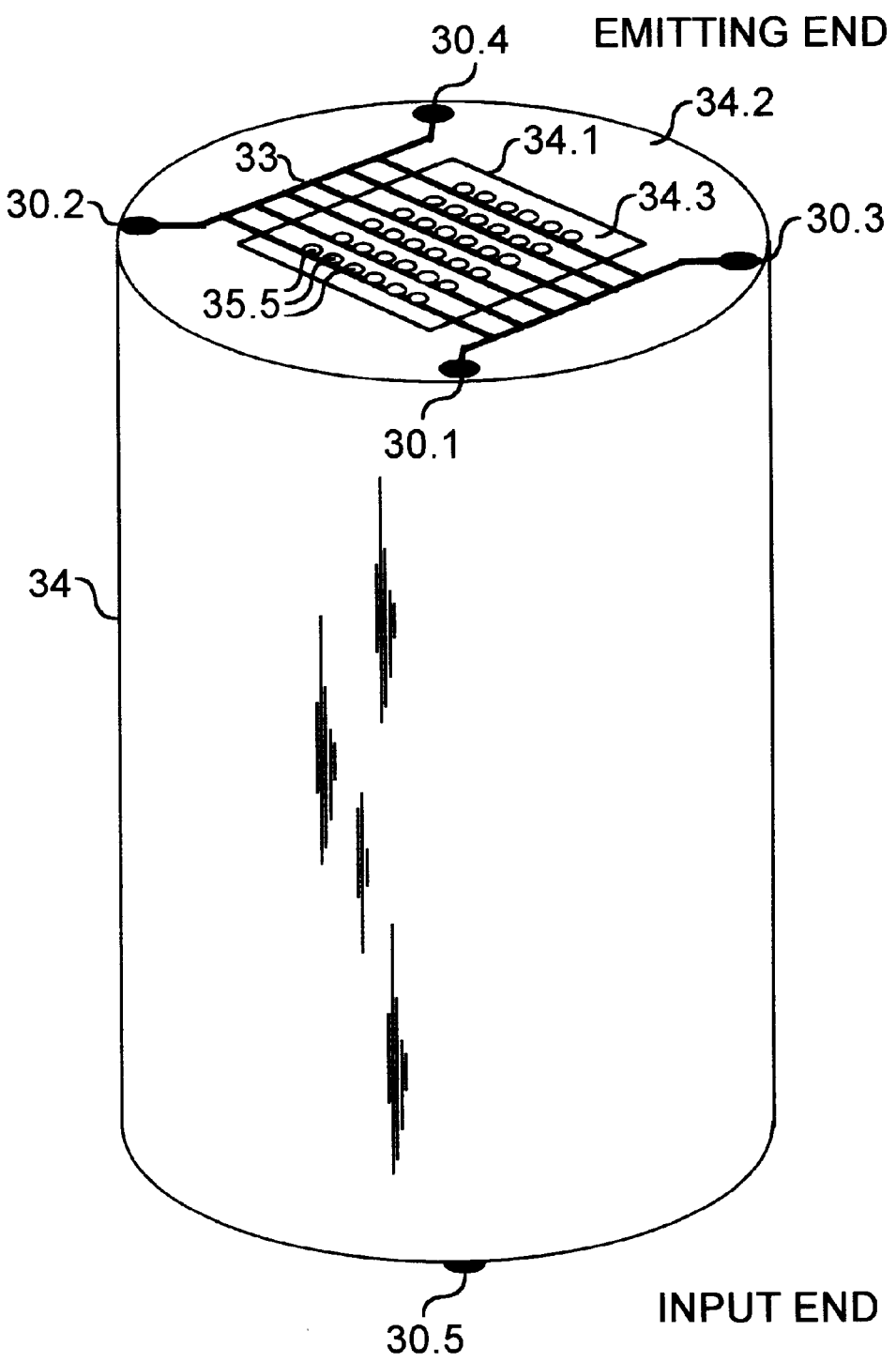
FIG. 5 Is a perspective view of a preferred embodiment of the waveguide assembly viewed from the emitting end.

Referring to FIG. 5, there is shown a perspective view of a preferred embodiment of the waveguide assembly 34 viewed from the emitting end. The waveguide assembly comprises a waveguide bundle 34.1, which is the operable core of the waveguide assembly, surrounded by an outer casing 34.2. The waveguide bundle itself comprises a large number of individual, essentially parallel and substantially identical phase modulator elements (as further described with reference to FIG. 6), embedded in a matrix structure 34.3 and arranged into a regular array within such matrix structure. Such phase modulator elements all terminate in their respective emitting elements 35.5 at the emitting end of such waveguide bundle in a regular two dimensional emitting array (as further described with reference to FIG. 3). In this example of a preferred embodiment, thirty six emitting elements are shown. It is noted that the size of the array may be increased by increasing the number of phase modulator elements.

The waveguide bundle may be fabricated firstly by making a long, thin, continuous optical fiber, referred to as a phase modulator fiber. The phase modulator fiber includes a central core of transparent electro-optical material, a control voltage electrode, a base voltage electrode and an outer cladding, which sub-components are similar to those of the phase modulator element itself (as further described with reference to FIG. 6). In a preferred embodiment, the cross-section of the phase modulator fiber is circular and in cross-section is substantially the same shape as the phase modulator element shown in FIG. 7. It may be fabricated using methods similar to those currently used to manufacture optical fibers, which methods are part of the prior art. The emitting array dimensions as further described with reference to FIG. 3, determine the relative dimensions of the central core and the outer cladding. After being fabricated to the required diameter, the phase modulator fiber may be assembled into a flat ribbon by positioning together a large number of adjacent fibers, taking care to maintain the orientation of the fibers throughout, and then bonding the fibers together. One ribbon may then be carefully layered on top of another and the process repeated many times, to form a three-dimensional bundle (in a manner similar to that used to manufacture coherent fiber optic bundles). The three-dimensional bundle may then be heated in order to cause adjacent elements to fuse, thereby forming a rigid bundle in which the material comprising the outer cladding of the phase modulator element becomes part of the matrix structure. The techniques used to do this may be similar to those used to form coherent fiber optic bundles, coherent optical fiber faceplates or mosaics, used in devices such as vidicons or image intensifiers, which techniques are part of the prior art. The fused bundles may then be cut into the required lengths, precisely ground and polished at the emitting and input ends, to form suitable surfaces for the next fabrication stage. The materials used in the fabrication of the waveguide assembly are carefully coordinated, in order to ensure that the physical characteristics, such as viscosity, softening point and coefficient of expansion of the central core, the outer cladding, the matrix structure, the control voltage electrode and base voltage electrode are closely matched, so that difficulties in fabricating the waveguide assembly are minimized.

In a preferred embodiment shown in FIG. 5, the resistor grid array 33, including the corner voltage terminals 30.1, 30.2, 30.3 and 30.4, are located at the emitting end, and the base bias grid including the base bias terminal 30.5 is located at the input end of the waveguide bundle. In alternative embodiments, this arrangement may be reversed, with the resistor grid array being at the input end and the base bias grid being at the emitting end, or the arrangement may have both the resistor grid array and the base bias grid at the same end, which could be either the emitting end and/or the input end. The resistor grid array may be fabricated on to the end of the waveguide bundle and connected to the control voltage electrodes (as further described with reference to FIG. 6 and FIG. 9) and the corner voltage terminals, by the use of photolithographic techniques similar to those employed for the fabrication of thin film resistor elements on integrated circuit chips, which techniques are part of the prior art. The base bias grid and the connections to the base voltage electrodes and the base bias terminal 30.5 may be fabricated similarly.

In another alternative embodiment, the entire electronic control circuit (as further described with reference to FIG. 12) and the associated connections may be fabricated on to the end of the waveguide assembly, using photolithographic techniques similar to those used for the fabrication of integrated circuit chips, which techniques are part of the prior art.

Referring to FIG. 6, there is shown a conceptual view of a preferred embodiment of adjacent phase modulator elements 35. The three adjacent phase modulator elements shown are individually designated $p_{i(j-1)}$, $p_{ij}$ and $p_{i(j+1)}$, and form part of the $(j-1)^{th}$, $j^{th}$ and $(j+1)^{th}$ columns in the $i^{th}$ row of an entire array of phase modulator elements in a waveguide bundle. Each of these phase modulator elements is one of a series of essentially parallel and substantially identical phase modulator elements of length L, arranged in rows and columns within the waveguide bundle (as further described with reference to FIG. 5). The phase modulator element on the left, $p_{i(j-1)}$, is shown without its non-reflective coating and without its outer cladding, in order to show more clearly the waveguide 35.1, the control voltage electrode 35.3, the base voltage electrode 35.2, connections to the resistor grid array 33 between row resistor elements 33.2, and connections to the base bias grid 36. In a preferred embodiment, each phase modulator element comprises:

a waveguide 35.1, created from a central core of transparent electro-optical material and the interface between such central core and its surrounding outer cladding (as further described with reference to FIG. 7);

a base voltage electrode 35.2;

a control voltage electrode 35.3;

an input port 35.4 at the input end where the incoming light enters the waveguide;

an emitting element 35.5 at the emitting end where the light emerges from the waveguide; and a non-reflective coating 35.7 on the emitting element and forming part of the emitting element, to prevent reflections back along the waveguide.

The waveguide is sandwiched between the base voltage electrode and the control voltage electrode, which run parallel to, and along virtually the entire length of, the waveguide, on the outer periphery of such waveguide. The base voltage electrodes are connected to the base bias grid 36, a portion of which is shown, which in turn is connected to the base bias terminal. The control voltage electrodes are connected to the resistor grid array 33, a portion of which is shown, which in turn is connected to the corner voltage terminals (as further described with reference to FIG. 9).

Referring to FIG. 7, there is shown a cross-sectional view taken along a line 7—7 in FIG. 6, of a preferred embodiment of a phase modulator element. In this preferred embodiment, each phase modulator element has a substantially circular cross-section. A central core 35.8, which constitutes the central light transmission path of the waveguide, is surrounded by a circular outer cladding 35.6 of a lower refractive index. The waveguide itself comprises such central core and the interface formed between such central core and such outer cladding. Each such waveguide is sandwiched between a base voltage electrode 35.2 and a control voltage electrode 35.3, which are separated by a distance, g. It is noted that other cross-sectional embodiments, including phase modulator elements with hexagonal cross-sections, are possible. Waveguides created from a central core and an outer cladding of lower refractive index are part of the prior art.

The central core provides the electro-optical medium in which the electric field created by the control voltage electrode and base voltage electrode induces a phase shift in the light passing through the waveguide. The requirements for the central core are that it be transparent, have a suitable linear electro-optical coefficient, have a higher refractive index than the outer cladding and be capable of being fabricated into a waveguide of the required dimensions. It is noted that any suitable electro-optical material may be used for the central core. One material which may be used in the central core is PLZT (lead lanthanum zirconate titanate), which also may contain traces of barium and strontium as stabilizing elements. Another material which may be used in the central core is PLSnZT (lead lanthanum stannate zirconate titanate), which may also contain traces of barium and strontium as stabilizing elements. The material of the outer cladding of the waveguide has a lower refractive index than that of the central core and may be opaque to light in the range intended to be used in this invention, or the waveguide bundle may be covered by a mask over the outer cladding at the input end to prevent light from travelling through it. Glasses or ceramics with the required properties suitable for the outer cladding are well known within the prior art. The control voltage electrode and base voltage electrode may be of indium or an indium alloy.

A transverse voltage is applied individually across each phase modulator element by means of the base voltage electrode and the control voltage electrode. For the $p_{ij}$ phase modulator element, the magnitude of such transverse voltage is the voltage difference, $\delta v_{ij}$, between the waveguide control voltage, $v_{ij}$, which occurs at the corresponding point in the resistor grid array, and the base bias voltage, $v_b$.

The transverse voltage, $\delta v_{ij}$, applied across the phase modulator element, causes a change in the phase angle of the light emitted by such phase modulator element with respect to the phase angle of the emitted light which would have occurred had there been no transverse voltage applied. Such phase angle change is referred to as the phase shift, $\delta \Psi_{ij}$, and is directly proportional to the magnitude of such applied transverse voltage. Mathematically:

$$\delta \Psi_{ij} = W_o \cdot L' \cdot \delta v_{ij}$$

Where:

$\delta \Psi_{ij}$ = Phase shift induced by $\delta v_{ij}$
$\delta v_{ij}$ = $v_{ij}$ - $v_b$
 = $v_{ij}$ in a preferred embodiment where $v_b = 0$
$W_o$ = an electro-optical constant for the waveguide dependent on the geometry, the electro-optical characteristics of the waveguide material and the wavelength of the light being passed through such waveguide
$L'$ = the effective length over which the transverse voltage is applied
 $\simeq$ L, the length of the waveguide, in a preferred embodiment The light entering the input ports is in phase, and hence the difference between the phase angles of the light emerging at the emitting end between the two adjacent phase modulator elements, $p_{ij}$ and $p_{i(j-1)}$, in the $i^{th}$ row, is given by:

$$\Delta \Psi_{i(j/j-1)} = \delta \Psi_{ij} - \delta \Psi_{i(j-1)}$$
$$= W_o \cdot L \cdot (v_{ij} - v_{i(j-1)})$$

Similarly, the phase angle difference of the light emerging at the emitting end between the two adjacent phase modulator elements, $p_{ij}$ and $p_{(i-1)j}$, in the $j^{th}$ column, is given by:

$$\Delta \Psi_{(i/i-1)j} = W_o \cdot L \cdot (v_{ij} - v_{(i-1)j})$$

The maximum voltage, $V_{max}$, which can be applied across any waveguide is determined by the maximum operating voltage gradient for the material used in the waveguide itself and the distance, g, between the control voltage electrode and base voltage electrode. Alternative embodiments of the phase modulator element are possible. One such embodiment is further described with reference to FIG. 8.

Referring to FIG. 8, there is shown a perspective view of a planar phase modulator element, which is an alternative embodiment of a phase modulator element. In this alternative embodiment:

The individual phase modulator elements for each row have been replaced by a single planar phase modulator element 32 for such row.

The waveguide has been replaced by a planar thin film waveguide 32.1 of an electro-optical material.

The control voltage electrode has been replaced by a planar control voltage electrode 32.3 comprised of a plate surface with a high electrical resistance. The material from which the planar control voltage electrode is made, provides the current path from one side of the planar control voltage electrode to the opposite side. The electrical resistance between such opposite sides of the planar control voltage electrode, takes the place of the row resistor elements in the preferred embodiment of the resistor grid array (as further described with reference to FIG. 9).

A side electrode 32.6 runs along the side of the planar control voltage electrode and is connected to the resistor grid array between column resistor elements 33.1. This side electrode is one of a pair of side electrodes for each planar control voltage electrode, the other one of which runs along the opposite side of the planar control voltage electrode and is connected to the resistor grid array at the same ii row location in the opposite column of the resistor grid array.

The base voltage electrode has been replaced by a planar base voltage electrode 32.2 comprising a low resistance plate surface about the same size as the planar control voltage electrode, substantially parallel to it and separated from it by a distance, g.

The planar base voltage electrode is connected to the base bias grid 36.

The input port has been replaced by a longitudinal input port 32.4 on the underside of the planar phase modulator element.

The emitting element has been replaced by a longitudinal emitting element 32.5.

A waveguide control voltage $v_{i1}$ is applied to the side electrode on one side of the planar control voltage electrode and another waveguide control voltage $v_{in}$ is applied to the side electrode on the opposite side of the planar control voltage electrode. The resulting voltage difference, $(v_{in}-v_{i1})$, across the opposing sides of such planar control voltage electrode, produces a substantially linear voltage gradient extending from one side of such planar control voltage electrode to the other. The transverse voltage between the planar control voltage electrode and the planar base voltage electrode, therefore, varies linearly from one side of the planar thin film waveguide to the other.

In an alternative embodiment of the invention, two or more such planar phase modulator elements are stacked on top of one another in a column, so as to produce a waveguide stack, with a linear emitting array of longitudinal emitting elements, which waveguide stack operates in a way similar to the waveguide bundle in the preferred embodiment of the invention (as further described with reference to FIG. 2). In another alternative embodiment of the invention specifically adapted for beam steering in one dimension, one or more planar phase modulator elements are similarly stacked on top of one another in a column to form a waveguide stack, but have their side electrodes connected directly to an electronic control circuit, without the need for a resistor grid array. In such alternative embodiment, a reference control voltage $v_{11}$ is applied to the side electrodes on one side of the planar phase modulator elements and a second corner voltage $v_{1n}$, is applied to the side electrodes on the opposite side. The electronic control circuit for this purpose is similar to the electronic control circuit specifically adapted for use in one dimensional steering of the output beam (as further described with reference to FIG. 12).

Figure 9:
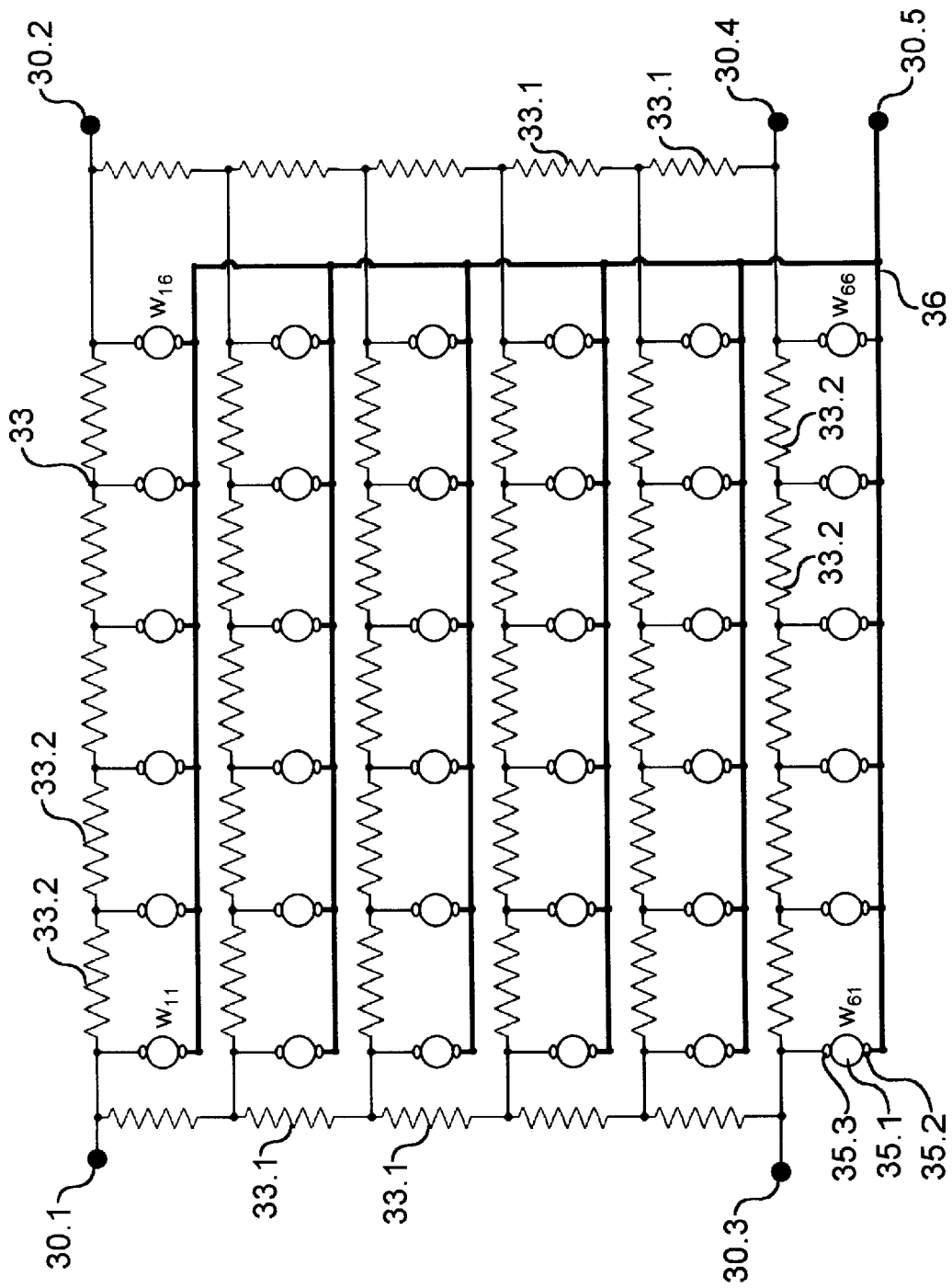
FIG. 9 Is an electrical schematic of a circuit showing a preferred embodiment of the resistor grid array and the base bias grid for a square emitting array.

Referring to FIG. 9, there is shown an electrical schematic of a circuit of a preferred embodiment of the base bias grid 36 and the resistor grid array 33 for a square emitting array (as further described with reference to FIG. 3), in which the number of rows in the emitting array, n, is equal to the number of columns in the emitting array, which is also equal to n. In this particular example, n is equal to six. Such a preferred embodiment of the resistor grid array for use in conjunction with a square emitting array, is referred to as a square resistor grid array. Although not part of the resistor grid array nor part of the base bias grid, certain subcomponents of the phase modulator elements, namely, the base voltage electrode 35.2, the control voltage electrode 35.3 and the waveguide 35.1, are included in FIG. 9 in order to show the connections to the resistor grid array. Corner waveguides at the corner of the array, which are designated $w_{11}$, $w_{16}$, $W_{61}$ and $w_{66}$, are shown next to their respective corner voltage terminals 30.1, 30.2, 30.3 and 30.4, in order to show the location of the corner voltage terminals in relation to the corner waveguides (which have the same location designations as their associated phase modulator elements and emitting elements).

The purpose of the base bias grid 36 is to maintain all base voltage electrodes 35.2 at substantially the same electrical potential, namely, $v_b$. It comprises the base bias terminal 30.5 and the electrical connections between the base bias terminal and the base voltage electrodes 35.2 of the phase modulator elements. The base bias voltage $v_b$ is applied to the base bias terminal 30.5.

Figure 15:
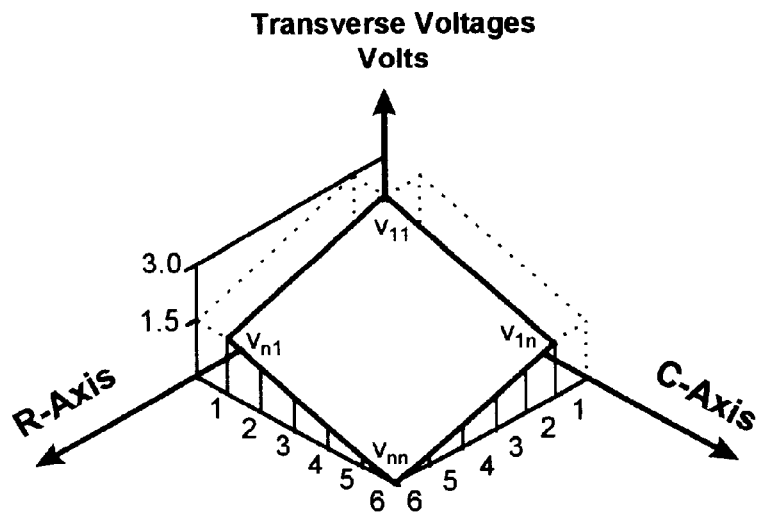
FIG. 15 Is a graphic illustration of the planar voltage distribution pattern of the transverse voltages with respect to the positions of their respective emitting elements in the emitting array, when both of the input control signals are at their minimum values.

The purpose of the resistor grid array 33 is to create voltage gradients within the resistor grid array when the corner voltages are applied across the corner voltage terminals, in such a way that the transverse voltages applied individually across the waveguides, resulting from the voltage gradients created within the resistor grid array, conform to a substantially linear pattern along any row and any column in the emitting array thereby ensuring that the resulting pattern of transverse voltages applied across the phase modulator elements is a planar voltage distribution pattern across the entire array (as further described by way of an example with reference to FIG. 15).

In a preferred embodiment shown in FIG. 9, the resistor grid array comprises:

the corner voltage terminals, 30.1, 30.2, 30.3 and 30.4, which are the connection points for receiving the corner voltages from the electronic control circuit, with the corner voltages, $v_{11}$, $v_{1n}$, $v_{n1}$ and $v_{nn}$ (as further described with reference to FIG. 12), respectively being applied to the corner voltage terminals, 30.1. 30.2. 30.3 and 30.4;

a total of n(n−1), namely thirty, row resistor elements 33.2, designated $r_r$;

a total of 2(n−1), namely ten, column resistor elements 33.1, designated $R_c$; and associated electrical connections linking the row resistor elements, the column resistor elements, the control voltage electrodes and the corner voltage terminals together as shown in FIG. 9.

The column resistor elements create a substantially linear voltage gradient between corner voltage terminal 30.1 and corner voltage terminal 30.3 on one side of the resistor grid array and a similar substantially linear voltage gradient between terminal 30.2 and terminal 30.4 on the other side of the resistor grid array. The row resistor elements create a substantially linear voltage gradient along each row for every row in the array. The waveguide control voltages applied to the control voltage electrodes of the phase modulator elements therefore follow such linear voltage gradients created within the resistor grid array.

In a preferred embodiment of the invention shown in FIG. 9:

The column resistor elements are located adjacent to the first and last columns of waveguides.

All the row resistor elements $r_r$ have substantially the same resistance, which is r ohms.

All the column resistor elements $R_c$ have substantially the same resistance, which is R ohms.

The resistance of the row and column resistor elements is high enough to keep the power dissipation within the limits of the waveguide assembly.

The value of R is very much lower than r in order to ensure that deviations from linearity in the planar voltage distribution pattern are kept to a minimum.

The current carrying capacity of $R_c$ is correspondingly higher than $r_r$.

Figure 12:
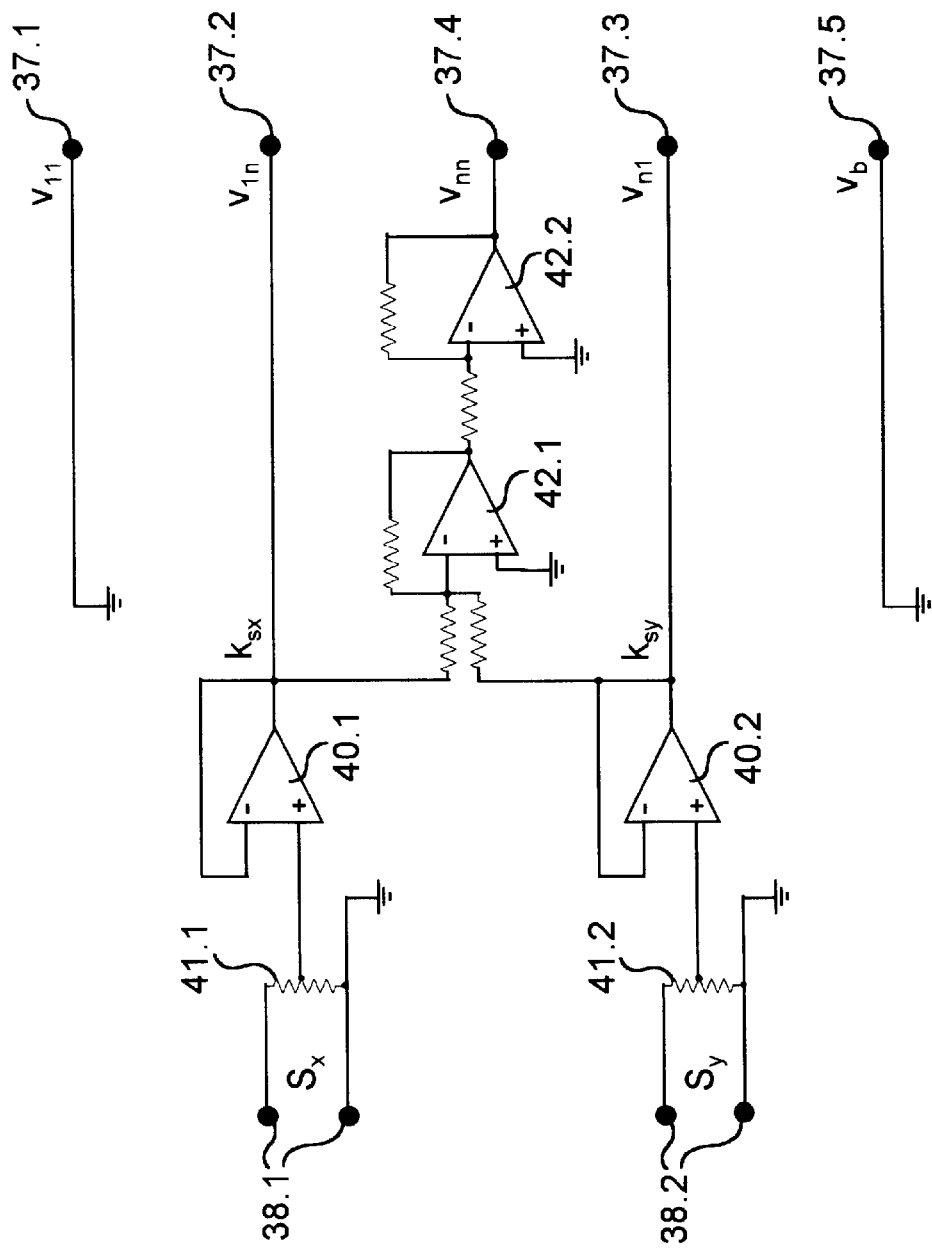
FIG. 12 Is an electrical schematic of a preferred embodiment of the electronic control circuit.
Figure 13:
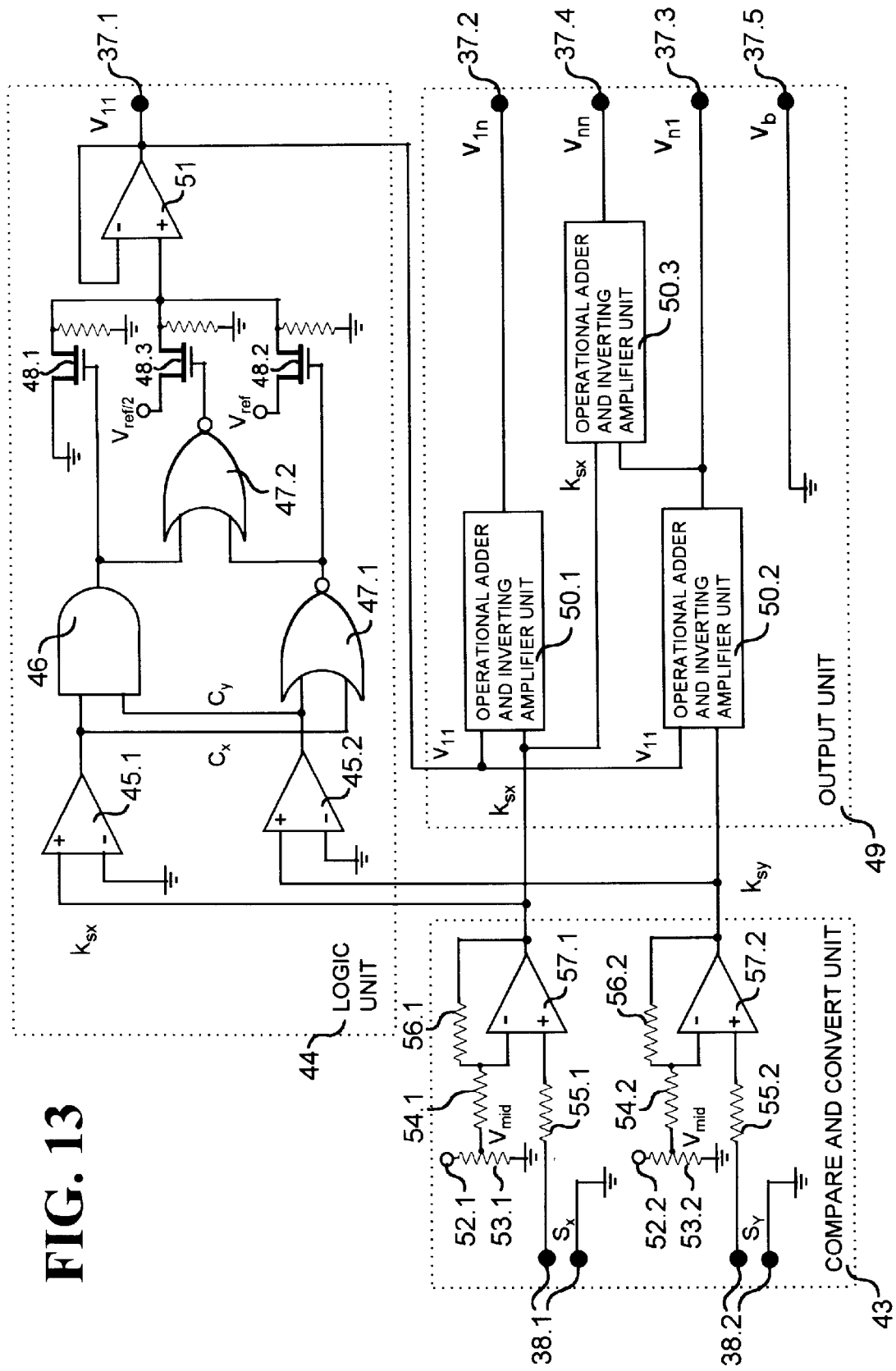
FIG. 13 Is an electrical schematic of an alternative embodiment of the electronic control circuit.

The base bias voltage received from the electronic control circuit, as further discussed with reference to FIG. 12 and FIG. 13, is zero volts.

The waveguide control voltages in any row are linearly distributed along such row and hence the transverse voltage, $\delta v_{ij}$, applied across phase modulator element $p_{ij}$ differs from that applied across the phase modulator elements in adjacent columns in such row by an amount $\Delta v_c$, such that:

$$\Delta v_c = \delta v_{ij} - \delta v_{i(j-1)}$$
$$= (v_{1n} - v_{11})/(n-1)$$
$$= (v_{nn} - v_{n1})/(n-1)$$

For convenience we define a quantity $k_{sx}$ such that:
$k_{sx}=(v_{1n}-V_{11})=(v_{nn}-v_{n1})$ Similarly in any column, the waveguide control voltages are linearly distributed along such column and hence the transverse voltage, $\delta v_{ij}$, applied across phase modulator element $p_{ij}$ differs from that applied across the phase modulator elements in adjacent rows in such column by an amount $\Delta v_r$, such that:

$$\Delta v_r = \delta v_{ij} - \delta v_{(i-1)j}$$
$$= (v_{n1} - v_{11})/(n-1)$$
$$= (v_{nn} - v_{1n})/(n-1)$$

For convenience we define a quantity $k_{sy}$ such that:
$k_{sy}=(v_{n1}-v_{11})=(v_{nn}-v_{1n})$ Applying these relationships to the phase angle difference between light emerging from any two adjacent phase modulator elements (as further described with reference to FIG. 7), we have:

For elements in adjacent Rows: $\Delta\Psi_r=W_o\cdot L\cdot k_{sy}/(n-1)$
For elements in adjacent Columns: $\Delta\Psi_c=W_o\cdot L\cdot k_{sx}/(n-1)$ In summary, by means of the resistor grid array, the difference between the phase angles of the light emerging from adjacent emitting elements, and hence the direction of the emerging output beam, may be varied by changing the values of $k_{sx}$ and $k_{sy}$.

The row and column resistor elements and associated electrical connections of the resistor grid array and the base bias grid may be fabricated on to the emitting end and/or input end of the waveguide bundle, as the case may be (as further described with reference to FIG. 5). Such resistor elements may be fabricated either from a metal or semiconductor material suited for the purpose. Fabrication of thin film resistor elements on to a substrate, which would be suitable for such a resistor grid array, is part of the prior art. It is noted that alternative embodiments of the resistor grid array are possible, as further described with reference to FIG. 10.

Figure 10:
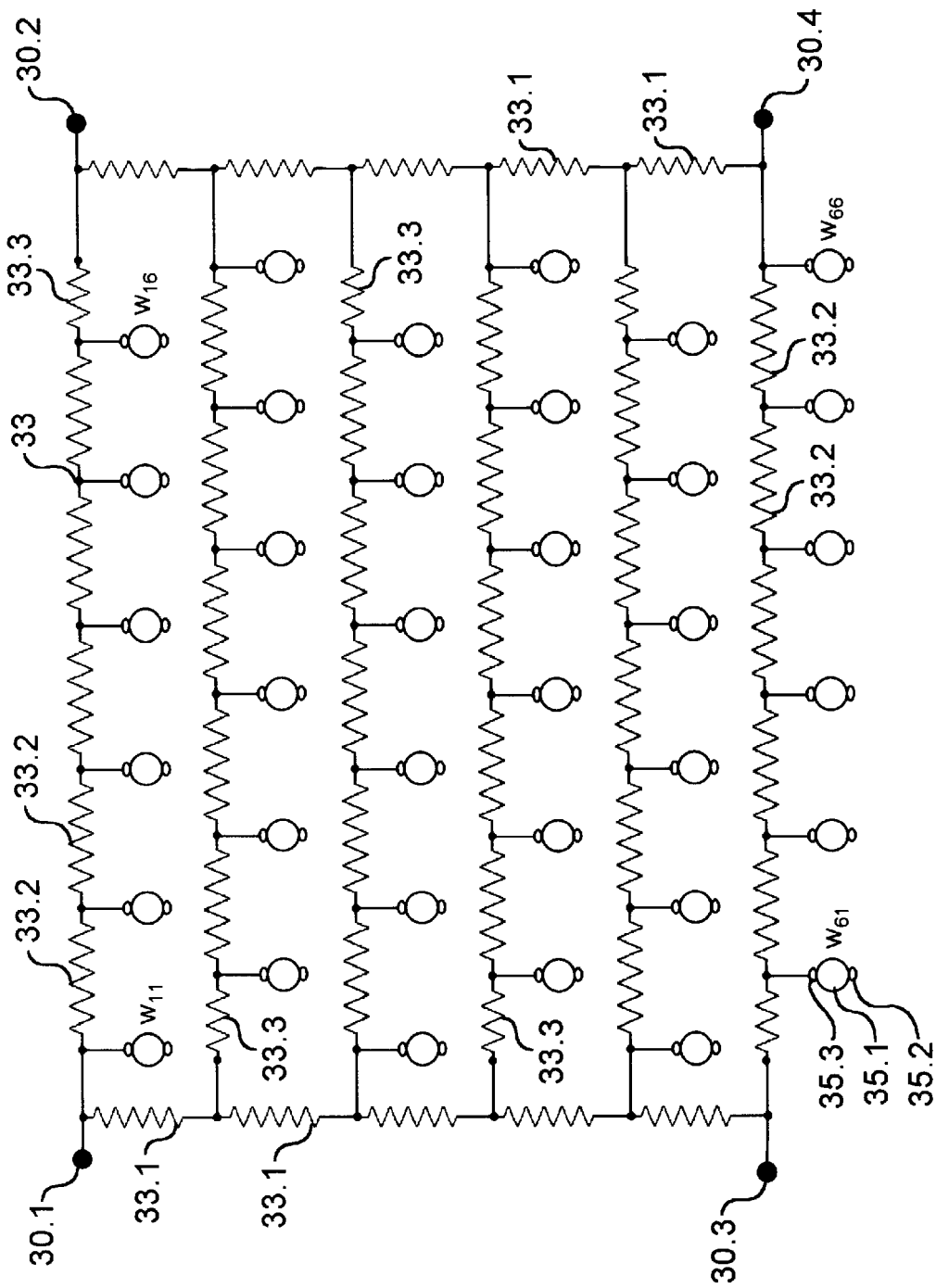
FIG. 10 Is an electrical schematic of a circuit showing an alternative embodiment of the resistor grid array for an offset square emitting array.

Referring to FIG. 10, there is shown an electrical schematic of a circuit of an alternative embodiment of the resistor grid array which may be utilized in conjunction with an offset square emitting array, as further described with reference to FIG. 4. Such an alternative embodiment of a resistor grid array for use in conjunction with an offset square emitting array is referred to as an offset square resistor grid array. The base bias grid for use with this alternative embodiment of the resistor grid array is the same as it is for use with the preferred embodiment as further described with reference to FIG. 9, and it has been omitted for clarity. In this alternative embodiment, a half value row resistor element 33.3, which has a resistance equal to half the value of the row resistor elements, namely r/2 ohms, is added to alternate ends of each row of the array as shown in order to compensate for the phase modulator elements in any row being spatially offset from those in adjacent rows.

In another alternative embodiment of the resistor grid array adapted for use in one dimensional steering of the output beam, the resistor grid array may be simplified by replacing the column resistor elements with direct connections, thereby maintaining corner voltage terminal 30.1 at the same potential as corner voltage terminal 30.3 and maintaining corner voltage terminal 30.2 at the same potential as corner voltage terminal 30.4. In such an embodiment, corner voltage terminals 30.1 and 30.3 may be replaced by a single terminal which for convenience is taken as 30.1 and similarly corner voltage terminals 30.2 and 30.4 may be replaced by a single terminal taken as 30.2, resulting in two corner voltage terminals 30.1 and 30.2 for the entire resistor grid array. It is noted that in another alternative embodiment of this invention each phase modulator element may be driven by its own amplifier as further described with reference to FIG. 11.

Figure 11:
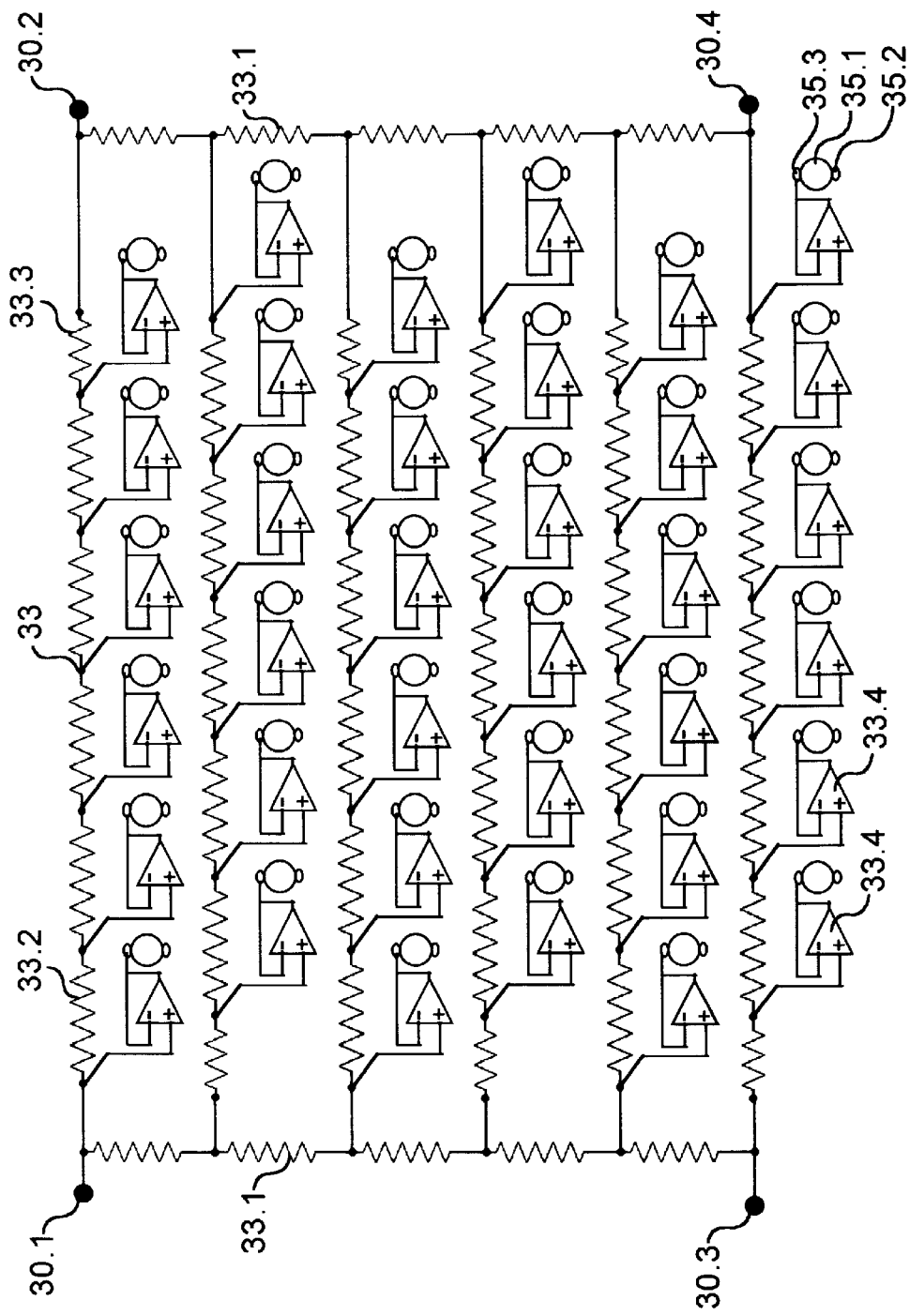
FIG. 11 Is an electrical schematic of a circuit showing an alternative embodiment of the resistor grid array in which each control voltage electrode is driven by a separate amplifier.

Referring to FIG. 11, there is shown an electrical schematic of a circuit of an alternative embodiment of the resistor grid array in which each control voltage electrode 35.3 is driven by a separate amplifier. configured as a voltage follower with a high input resistance and a low output resistance and referred to as the control voltage follower 33.4. In such an embodiment of the invention, the voltage gradients along the row and column resistor elements of the resistor grid array provide a planar voltage distribution pattern to drive all such control voltage followers.

Referring to FIG. 12, there is shown an electrical schematic of a preferred embodiment of the electronic control circuit. The purpose of the electronic control circuit is to convert the two input control signals, $S_x$ and $S_y$ in such a way as to produce corner voltages, $v_{11}$, $v_{1n}$, $v_{n1}$ and $v_{nn}$, which when applied across the corner voltage terminals of the resistor grid array, produce a substantially planar voltage distribution pattern of transverse voltages across the emitting array, corresponding to the required direction of the output beam defined by the two input control signals.

The required relationship between the corner voltages in order to achieve a planar voltage distribution pattern, is as described with reference to FIG. 9, namely:

$$v_{1n}=v_{11}+k_{sx}$$

$$v_{n1}=v_{11}+k_{sy}$$

$$v_{nn}=v_{11}+k_{sx}+k_{sy}$$

The voltage $v_{11}$ is the reference voltage from which the other voltages are derived and is referred to as the reference control voltage. The three derived voltages., $v_{1n}$, $v_{n1}$ and $v_{nn}$, are collectively referred to as the three analog control voltages. The four voltages, $v_{11}$, $v_{1n}$, $v_{n1}$ and $v_{nn}$, are collectively referred to as the corner voltages, with $v_{11}$, the first of the corner voltages, being referred to as the reference control voltage, $v_{1n}$ as the second corner voltage, $v_{n1}$ as the third corner voltage and $v_{nn}$ as the fourth corner voltage. The quantity $k_{sx}$ is referred to as the first intermediate signal and the quantity $k_{sy}$ is referred to as the second intermediate signal and both $k_{sx}$ and $k_{sy}$ are collectively referred to as the intermediate signals.

In the preferred embodiment of the electronic control circuit shown in FIG. 12, $k_{sx}$ and $k_{sy}$ are related to the two input control signals as follows:

$$k_{sx}=a_{x1}\times S_x$$

and $$k_{sy}=a_{y1}\times S_y$$

where $a_{x1}$ and $a_{y1}$ are scaling factors to match the input control signals to the required operating range of the corner voltages In this embodiment, the electronic control circuit is kept simple by grounding the reference control voltage $v_{11}$ to the electrical ground of the electronic control circuit, which is taken as the zero voltage reference. Consequently the steering range (also referred to as the scanning range) is limited to only one quadrant of the projection plane, namely Quadrant One (as further described with reference to FIG. 16).

In this preferred embodiment of the electronic control circuit, the operating parameters are described as follows. The minimum value of any of the corner voltages is zero. SX and Sy lie in a range between zero and $S_{max}$. The nominal upper operating voltage limit of the resistor grid array of the waveguide bundle is $V_{ref}$ and hence the maximum value of any of the corner voltages is $V_{ref}$. Since $v_{11}$ and $v_b$ are both equal to zero volts, the corner voltage relationships become:

$$v_{1n}=a_{x1}\times S_x$$

$$v_{n1}=a_{y1}\times S_y$$

$$v_{nn}=a_{x1}\times S_x+a_{y1}\times S_y$$

Referring again to FIG. 12, the electronic control circuit achieves these relationships by providing a reference control voltage equal to zero volts which is designated $v_{11}$, and applies it to circuit terminal 37.1, which is then applied to corner voltage terminal 30.1 of the resistor grid array. It also converts the input control signals, $S_x$ and $S_y$, which are fed into signal input terminals 38.1 and 38.2 respectively, into three analog control voltages, which become the second, third and fourth corner voltages, $v_{1n}$, $v_{n1}$ and $v_{nn}$. The second, third and fourth corner voltages are applied to circuit terminals 37.2, 37.3 and 37.4 and then to the corner voltage terminals 30.2. 30.3 and 30.4 of the resistor grid array respectively. The electronic control circuit also provides the ground connection for the base bias voltage, $v_b$, which is applied to circuit terminal 37.5 and then to the base bias terminal 30.5 of the base bias grid. The electronic control circuit receives power at the appropriate voltage and current levels needed to operate the device from an external electronic power supply source, the technology of which is well known in the prior art.

The two input control signals. $S_x$ and $S_y$, are fed into the electronic control circuit through signal input terminals 38.1 and 38.2 respectively. $S_x$ is fed into a voltage divider 41.1 and then into voltage follower 40.1 with a high input resistance and low output resistance. The output is the first intermediate signal, $k_{sx}$ (which is a voltage proportional to $S_x$), which is then fed to circuit terminal 37.2, as vin. $S_y$ is fed into a similar voltage divider 41.2 and then into voltage follower 40.2 with a high input resistance and low output resistance. The output is the second intermediate signal, $k_{sy}$ (which is a voltage proportional to $S_y$), which is then fed to circuit terminal 37.3, as $v_{n1}$. Both $k_{sx}$ and $k_{sy}$ are fed into an operational adder 42.1 the output of which is inverted by an inverting amplifier 42.2 with low output resistance. Both such operational adder and inverting amplifier have their associated resistance elements configured such that each has a gain of −1. and the output voltage, which is fed to circuit terminal 37.4 as $v_{nn}$, is equal to the sum of the two intermediate signals $k_{sx}$ and $k_{sy}$. All the sub-components from which this preferred embodiment of the electronic control circuit is fabricated are within the prior art.

In an alternative embodiment of this invention specifically adapted for use in one dimensional steering of the output beam, the electronic control circuit may be simplified by eliminating the circuit components for producing $v_{n1}$ and $v_{nn}$, but keeping other circuit components and parameters the same as in the preferred embodiment, including grounding the base bias voltage $v_b$ and the reference control voltage $v_{11}$. This results in a single input control signal, which for convenience is designated $S_x$, and a single analog control voltage, which for convenience is designated $v_{1n}$. This alternative embodiment of the electronic control circuit may be used in conjunction with the alternative embodiment for a resistor grid array specifically adapted for use in one dimensional steering of the output beam, as further described with reference to FIG. 10. In such an embodiment adapted for one dimensional steering, the electronic control circuit provides a reference control voltage which is designated $v_{11}$, and applies it to corner voltage terminal 30.1 of the resistor grid array. It converts the input control signal, $S_x$ into an analog control voltage proportional to $S_x$, which becomes the second corner voltage, $v_{1n}$, which is applied to the corner voltage terminal 30.2 of the resistor grid array. The electronic control circuit also provides the ground connection for the base bias voltage, $v_b$, which is applied to the base bias terminal 30.5 of the base bias grid. Alternative embodiments of the electronic control circuit are possible as further described with reference to FIG. 13.

Referring to FIG. 13, there is shown an electrical schematic of an alternative embodiment of the electronic control circuit. In this alternative embodiment additional circuitry is employed in order to increase the scanning range of the device to all four quadrants of the projection plane, by applying a reverse tilt to the planar voltage distribution pattern applied across the array. This is achieved by adjusting the value of the reference control voltage $v_{11}$ according to a logical process which determines on which quadrant of the projection plane the projected output beam is to be located, based on the value of the input control signals. This alternative embodiment comprises three sub-units within the electronic control circuit:

- The compare and convert unit 43 compares the input control signals $S_x$ and $S_y$ with their respective midpoints and converts $S_x$ into a scaled first intermediate signal $k_{sx}$ and $S_y$ into a scaled second intermediate signal $k_{sy}$, which are respectively proportional to the amounts by which $S_x$ and $S_y$ differ from their respective midpoints.
- The logic unit 44 determines which one of three possible values the reference control voltage $v_{11}$ should be, based on the polarities of the intermediate signals $k_{sx}$ and $k_{sy}$.
- The output unit 49 derives the values of the three analog control voltages from the intermediate signals $k_{sx}$ and $k_{sy}$ and the reference control voltage $v_{11}$.

The required relationships between the corner voltages in order to achieve a planar voltage distribution pattern are the same as described with reference to FIG. 12, namely:

$$v_{1n}=v_{11}+k_{sx}$$

$$v_{n1}=v_{11}+k_{sy}$$

$$v_{nn}=v_{11}+k_{sx}+k_{sy}$$

In this alternative embodiment of the electronic control circuit, the reference control voltage $v_{11}$ is varied by the values of the two input control signals, in order to achieve a reverse tilt of the planar voltage distribution pattern applied across the array. To achieve this reverse planar tilt of the planar voltage distribution pattern, the value of $v_{11}$ is one of three values defined by the following logical relationships:

| | |
|---|---|
| If $k_{sx} \geq 0$ and $k_{sy} \geq 0$, | then $v_{11} = 0$ |
| If $k_{sx} \geq 0$ and $k_{sy} < 0$, | then $v_{11} = V_{ref/2}$ |
| If $k_{sx} < 0$ and $k_{sy} \geq 0$, | then $v_{11} = V_{ref/2}$ |
| If $k_{sx} < 0$ and $k_{sy} < 0$, | then $v_{11} = V_{ref}$ | where the symbol $\geq$ means greater than or equal to; and where $V_{ref/2}=0.5\times V_{ref}$ The first intermediate signal $k_{sx}$ and the second intermediate signal $k_{sy}$ are proportional to the amount by which the two input control signals differ from their respective midpoints. Mathematically:

$$k_{sx}=a_{x2}(S_x-S_{xmid})$$

and $$k_{sy}=a_{y2}(S_y-S_{ymid})$$

where $a_{x2}$ and $a_{y2}$ are scaling factors to match the input control signals to the required operating range of the corner voltages In this alternative embodiment of the electronic control circuit, the operating parameters are:

- $S_x$ lies in a range between $S_{xmin}$ and $S_{xmax}$ with a midpoint value $S_{xmid}=(S_{xmin}+S_{xmax})/2$.
- $S_y$ lies in a range between $S_{ymin}$ and $S_{ymax}$ with a midpoint value $S_{ymid}=(S_{ymin}+S_{ymax})/2$.

The operating ranges for $S_x$ and $S_y$ are the same, namely, $S_{ymin}=S_{ymin}$ and $S_{xmax}=S_{ymax}$.

$V_{mid}$ is a characteristic of the operating range of the input control signals and is equal to $S_{xmid}$ (which in turn is equal to $S_{ymid}$).

When $S_x$ and $S_y$ are at their midpoint values, the output beam projects on to a point at the origin of the projection plane (as further described with reference to FIG. 16).

The nominal upper operating voltage limit of the resistor grid array of the waveguide bundle is $V_{ref}$ and hence the maximum value of any of the corner voltages is $V_{ref}$.

The minimum value of any of the corner voltages is zero.

The base bias voltage $v_b$ is grounded and its voltage is therefore zero.

The maximum value of the first intermediate signal $k_{sx}$ is equal to the maximum value of the second intermediate signal $k_{sy}$, and both are equal to $V_{ref/2}$.

The scaling factors $a_{x2}$ and $a_{y2}$ are set as follows:

$$a_{x2}=V_{ref/2}/(S_{xmax}-S_{ymid})=a_{y2}=V_{ref/2}/(S_{ymax}-S_{ymid})$$

Certain reference voltages are received from an external power source and are available within the electronic control circuit in order to compare and scale the outputs accurately, as follows:

$V_{mid}$ is set equal to $S_{xmid}$ (which is equal to $S_{ymid}$).

$V_{ref}$ is set at the required level, as is $V_{ref/2}$.

A ground connection provides the zero voltage reference.

It is noted that the base bias voltage and the corner voltages are set at zero for design convenience only. Other embodiments using positive and/or negative voltages for the corner voltages and/or a base bias voltage different from zero volts are possible. It is also noted that there are other embodiments in which $a_{x2}$ is not equal to $a_{y2}$ either in order to compensate for row-column asymmetry in the array or deliberately to introduce asymmetry into the x and y scanning relationship.

In the alternative embodiment shown in FIG. 13, an electronic power supply source, a technology which is well known in the prior art, provides power at the appropriate voltage and current levels and the various reference voltages needed to operate the device. The $S_x$ input control signal is fed through signal input terminals 38.1 into a subtraction circuit of the compare and convert unit 43, where $V_{mid}$ is subtracted from it. Such subtraction circuit comprises the feedback resistor 56.1 (also referred to as $R_{56.1}$), the two input resistors of equal resistance 54.1 and 55.1 (each also referred to as $R_{54.1}$ and $R_{55.1}$), an operational amplifier 57.1, and a voltage divider 53.1. A supply voltage is applied to terminals 52.1 and 52.2 of voltage dividers 53.1 and 53.2 respectively, in order to produce the voltage, $V_{mid}$. Such voltage dividers are calibrated to ensure precise values for $S_{xmid}$ and $S_{ymid}$. The output from the subtraction circuit is scaled by setting the value of $R_{56.1}$, equal to the product of $a_{x2}$ and the value of $R_{54.1}$, so that the resulting output voltage, which is the first intermediate signal $k_{sx}$, is equal to $a_{x2}(S_x-S_{mid})$. The $S_y$ input control signal which is fed through signal input terminals 38.2 is similarly converted into the second intermediate signal $k_{sy}$ by a similar subtraction circuit, (comprising the feedback resistor 56.2 (also referred to as $R_{56.2}$, the resistance value of which is equal to the product of $a_{y2}$ and the value of $R_{54.2}$), the two input resistors of equal resistance 54.2 and 55.2 (each also referred to as $R_{54,2}$ and $R_{55,2}$). an operational amplifier 57.2 and the voltage divider 53.2). The second intermediate signal $k_{sy}$ is equal to $a_{y2}(S_y - S_{ymid})$.

The first intermediate signal $k_{sx}$ is then fed into a comparator 45.1 (set up as a zero-crossing detector) of the logic unit 44. Such comparator checks the polarity and produces a high logic output state for $k_{sx} \geq 0$ and a low logic output state for $k_{sx} < 0$. This logic output state is designated $C_x$. A similar logic output state, $C_y$, is derived by comparator 45.2 from the intermediate signal $k_{sy}$. $C_x$ and $C_y$ feed into the AND Gate 46 and the NOR Gate 47.1, the outputs of which feed into NOR Gate 47.2 as shown. Logic output states are produced on the outputs of AND Gate 46, NOR Gate 47.2 and NOR Gate 47.1, only one of which logic output states is in a high logic output state at any time. Such high logic state drives one of the three electronic switches 48.1, 48.3 or 48.2. When such electronic switch is activated, it connects a reference voltage to the input of voltage follower 51 and in turn produces an output voltage for vole to circuit terminal 37.1 which is either 0, $V_{ref/2}$ or $V_{ref}$, depending on the logical relationship between the polarities of $k_{sx}$ and $k_{sy}$.

Intermediate signals $k_{sx}$ and $k_{sy}$ and reference control voltage vi are then fed into the output unit 49. Each of the operational adder and inverting amplifier units 50.1, 50.2 and 50.3 of such output unit produces an output equal to the sum of its inputs. Each such operational adder and inverting amplifier unit is substantially the same as the combined operational adder 42.1, inverting amplifier 42.2 and associated resistance elements as further described with reference to FIG. 12. The intermediate signals $k_{sx}$ and $k_{sy}$ are fed into the operational adder and inverting amplifier units 50.1 and 50.2 respectively, along with $v_{11}$ as shown, producing $v_{1n}$ to circuit terminal 37.2 and $v_{n1}$ to circuit terminal 37.3. The operational adder and inverting amplifier unit 50.3 adds $k_{sx}$ to the output from the unit 50.2, producing $v_{nn}$ to circuit terminal 37.4. All the output amplifiers used in the electronic control circuit are of low output resistance. The electronic control circuit also provides the ground for the bas e bias voltage, $v_b$, which is applied to circuit terminal 37.5.

The electronic control circuit of this alternative embodiment is fabricated from subcomponents all of which are within the prior art. While other ranges of operating voltages are possible, a typical application of a preferred embodiment may have the following operating parameters:

> $S_x$ and $S_y$ have an operating range from 1 to 5 volts
> $S_{xmin} = S_{ymin} = 1$ volt
> $S_{xmax} = S_{ymax} = 5$ volt
> $S_{xmid} = S_{ymid} = 3$ volt
> $a_x = a_y = 0.75$ volt/volt
> $V_{ref} = 3$ volt
> $k_{sxmax} = k_{symax} = 1.5$ volt
> $v_{11max} = v_{1nmax} = v_{n1max} = v_{nnmax} = 3$ volt In an alternative embodiment, the electronic control circuit comprises a programmable controller, which may be a programmable logic controller, a digital controller or control computer programmed to produce the corner voltages from the two input control signals. The input signal to such programmable controller may be either analog or digital. In a further enhancement of an alternative embodiment, the electronic control circuit contains the means for improving the positioning accuracy of the output beam by applying trigonometric functions to the input signals and/or the intermediate signals. By introducing offsetting compensation for the error introduced when the difference between sin θ and tan θ becomes significant, as discussed with reference to FIG. 16, the electronic control circuit permits large projection angles and increases the effective operating range of the output beam.

In other embodiments the input control signals $S_x$ and $S_y$ may be in any other convenient form, including positive and negative voltages, analog current loops, digital inputs, variable resistance inputs, fiber-optic signals and so on. There are many other embodiments capable of achieving the required relationships between $S_x$ and $S_y$ and the corner voltages by the use either singly or in combination of different circuits or controllers designed to achieve the required relationships.

Referring to FIG. 14, there is shown a tabulation of a sampling of input control signals, intermediate signals, logic output states, corner voltages and the illuminated spot coordinates for a series of three scans of the two input control signals. The values shown are for the typical operating parameters of the alternative embodiment of the electronic control circuit described with reference to FIG. 13, in which the input control signals $S_x$ and $S_y$ have an operating range from 1 to 5 volts. The x and y coordinates of the illuminated spot of the output beam are expressed as a percentage of their respective scanning ranges. The first column of the third scan shows the values for both input control signals at their minimum values, which represents one of the end points of the operating range.

Referring to FIG. 15, there is shown a graphic illustration of a particular example of the planar voltage distribution pattern when both of the input control signals are at their minimum values. Such planar voltage distribution pattern is formed by plotting the value of the transverse voltages, which are applied individually across each phase modulator element, against the respective position in the emitting array of the emitting element associated with each such phase modulator element. The relationships among the corner voltages (as further described with reference to FIG. 13), are such that when the corner voltages are plotted against the positions of their associated corner emitting elements, such plot of corner voltages forms a plane. Because the voltage gradients created within the resistor grid array are linear, (as further described with reference to FIG. 9), the planar voltage distribution pattern formed by plotting all the transverse voltages, is substantially the same plane as would be formed if the corner voltages were plotted against the corner emitting elements. Such planar voltage distribution pattern is therefore oriented in a direction defined by the input control signals.

The values of the transverse voltages used in FIG. 15 are derived from the corner voltages shown in the first column of the third scan of the tabulation in FIG. 14. Such corner voltages represent one of the end points of the operating range of the input control signals $S_x$ and $S_y$ for the alternative embodiment of the electronic control circuit described with reference to FIG. 13. In such circumstances, both $S_x$ and $S_y$ are at 1 volt and $v_{11}$, $v_{1n}$, $v_{n1}$ and $v_{nn}$ are at 3, 1.5, 1.5 and 0 volts respectively. The R-axis (to denote row numbers) and the C-axis (to denote column numbers) are used to define positions of the emitting elements in the emitting array, corresponding to their respective phase modulator elements. The column and row locations of the emitting elements are the same as those of the square emitting array described with reference to FIG. 3. All such emitting elements lie within the plane encompassed by coordinates (1, 1), (1, 6), (6, 1) and (6, 6), which locate the corner emitting elements $e_{11}$, $e_{16}$, $e_{61}$ and $e_{66}$ of phase modulator elements $p_{11}$, $p_{16}$, $p_{61}$ and $p_{66}$ respectively.

Figure 16:
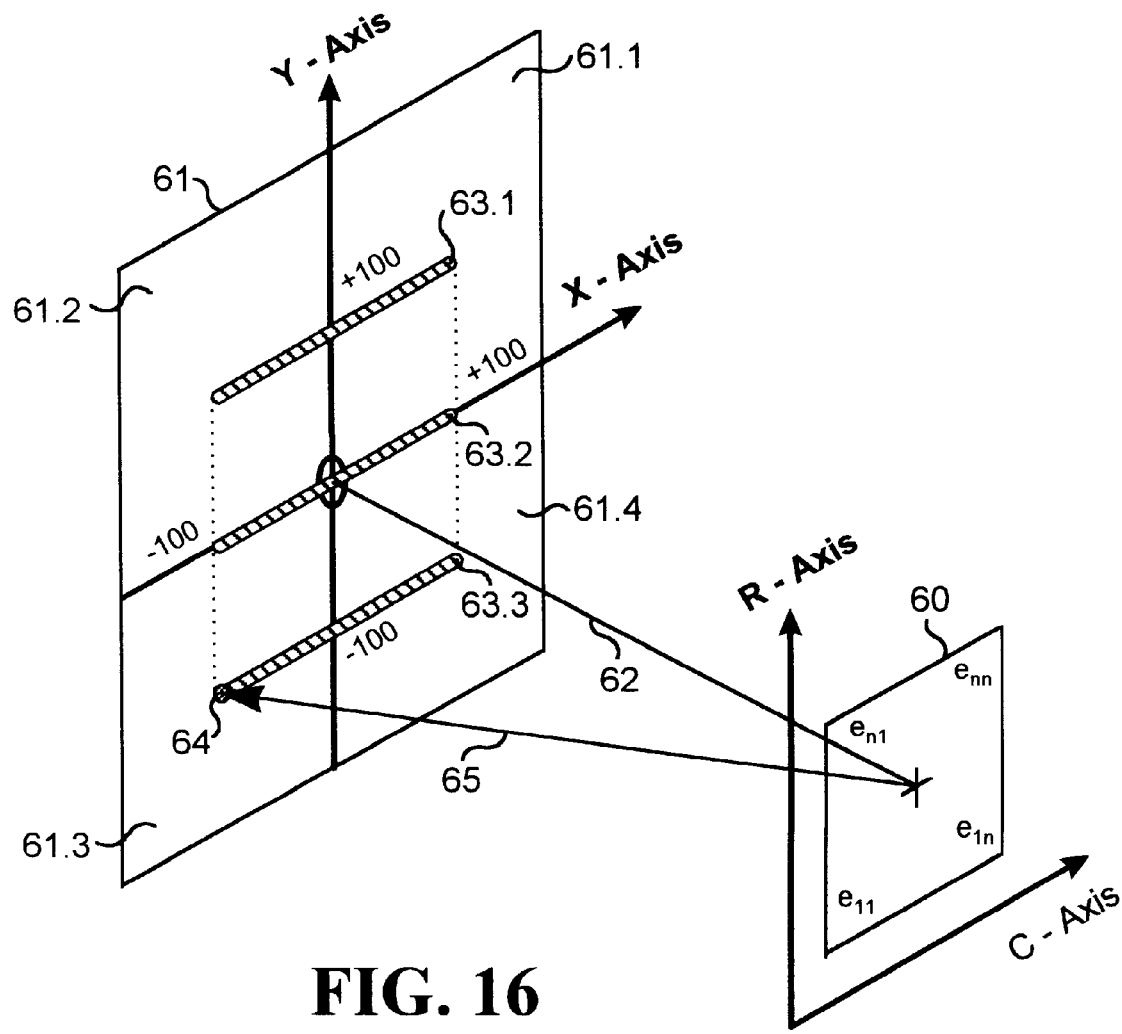
FIG. 16 Is a graphic illustration showing the geometric relationships among the plane of the emitting array, the output beam, the projection plane and the illuminated spot formed on the projection plane by the output beam.

Referring to FIG. 16, there is shown a graphic illustration of the geometric relationships among the plane of the emitting array 60, the output beam 65, the projection plane 61 and the illuminated spot 64 formed on the projection plane by the output beam. The projection plane is defined as the plane at a distance, K, from the plane of the emitting array, lying parallel to it, and having the origin of its X and Y axes located at the point of intersection of the projection plane and the orthogonal line from the center of the emitting array. Such orthogonal line running through the origin of the projection plane is referred to as the center axis 62. Shown in FIG. 16 are:

the plane of the emitting array defined by the plane of the C-axis and the R-axis as further described with reference to FIG. 15;

the relative locations of the corner emitting elements, $e_{11}$, $e_{1n}$, $e_{n1}$ and $e_{nn}$, in the plane of the emitting array;

the projection plane, with its X and Y axes scaled to show the (x, y) coordinates of the illuminated spot on the projection plane as percentages of the maximum scanning limits from the origin, in the x and y directions respectively;

Quadrant One 61.1. Quadrant Two 61.2, Quadrant Three 61.3 and Quadrant Four 61.4 in the projection plane;

the center axis;

the scanning lines 63.1. 63.2 and 63.3 for Scans 1, 2 and 3 respectively, as referenced in the tabulation in FIG. 14; and the position (−100, −100), of the illuminated spot on to the projection plane corresponding to the planar voltage distribution pattern as described with referenced to FIG. 15.

The (x, y) position coordinates of any illuminated spot created by the output beam on the projection plane may be expressed as follows:

$$x = f_x \cdot K \cdot \tan \theta$$

$$y = f_y \cdot K \cdot \tan \alpha$$

Where:

$\theta$=angle between the center axis and the line from the projection of the x coordinate on to the X-axis to the center of the emitting array $\alpha$=angle between the center axis and the line from the projection of the y coordinate on to the Y-axis to the center of the emitting array $f_x$=a factor to express the x value as a percentage of the scanning range $f_y$=a factor to express the y value as a percentage of the scanning range Since $\theta = \arcsin(\Delta\Psi_c \cdot \lambda / 2\pi \cdot d)$ (similar to derivation of $\phi$ described with reference to FIG. 1)

And $\Delta\Psi_x = W_o \cdot L \cdot k_{sx}/(n-1)$ (as further described with reference to FIG. 9)

And $\sin \theta \cong \tan \theta$ (for low values of $\theta$, less than about 10 degrees)

Then $x \cong k_{sx} \cdot f_x \cdot W_o \cdot L \cdot K \cdot \lambda / 2\pi \cdot d \cdot (n-1)$ And $y \cong k_{sy} \cdot f_y \cdot W_o \cdot L \cdot K \cdot \lambda / 2\pi \cdot d \cdot (n-1)$ Hence, for the relatively low projection angles of the output beam in typical embodiments of this invention, x and y are very nearly proportional to the intermediate signals $k_{sx}$ and $k_{sy}$ respectively. Since $k_{sx}$ and $k_{sy}$ are proportional to the amounts by which $S_x$ and $S_y$ differ from their respective midpoints, the x and y coordinates defining the position of the illuminated spot of the output beam on the projection plane are very nearly proportional to the respective amounts by which $S_x$ and $S_y$ differ from their respective midpoints. In an alternative embodiment of this invention, the electronic control circuit, as further described with reference to FIG. 13, may contain a trigonometric function capability to compensate for errors when $\sin \theta$ diverges significantly from $\tan \theta$.

FIG. 16 shows the loci of the position coordinates of the illuminated spot along three scanning lines for the values of input control signals tabulated in FIG. 14. For example:

When both input control signals $S_x$ and $S_y$ lie at their respective midpoints, (corresponding to values in column 3 of Scan 2), the coordinates of the illuminated spot are (0, 0);

When both the input control signals $S_x$ and $S_y$ are at their minimum values, (corresponding to values in column 1 of Scan 3), the coordinates of the illuminated spot are (−100, −100);

And so on for all other points within the scanning range.

Therefore the direction of the output beam may be controlled continuously over its operating range by appropriate adjustments to the input control signals, with the coordinates of the illuminated spot on the projection plane on to which the output beam projects being directly related to the value of such input control signals.

While the invention has been described in terms of specific embodiments, the foregoing description will make many alternatives modifications and variations apparent to those skilled in the art. Accordingly, it is intended to embrace all alternatives, modifications and variations that fall within the spirit and scope of the appended claims.

I claim:

1. An apparatus for producing, from a polarized coherent light source, an output beam which can be steered in two dimensions by means of two input control signals, comprising:

a) a waveguide bundle with an input end and an emitting end, comprising:

a multiplicity of similar phase modulator elements each of which comprises:

a waveguide of an electro-optical material;

an input port at the input end of said waveguide to receive the polarized coherent light;

an emitting element at the emitting end of said waveguide to allow phase shifted light to emerge;

a control voltage electrode electrically connected to a resistor grid array; and a base voltage electrode electrically connected to a base bias grid;

said control voltage electrode and said base voltage electrode running along the length of said waveguide and comprising the means for applying a transverse voltage across said waveguide, by which a phase shift in the light passing through said waveguide is induced proportional to the magnitude of the transverse voltage and the effective length over which the transverse voltage is applied; and an emitting array at the emitting end comprising a regular array formed from said emitting elements, from which the output beam is produced by the interference of the emerging phase shifted light;

b) an electronic control circuit comprising the means for receiving the two input control signals, providing a base bias voltage and producing four corner voltages, which corner voltages are interrelated in such a way that when said four corner voltages are applied across four corner voltage terminals of said resistor grid array, said four corner voltages produce a substantially planar voltage distribution pattern of the transverse voltages across said emitting array, the orientation of which substantially planar voltage distribution pattern is consistent with the required direction of the output beam defined by the two input control signals;

c) said resistor grid array comprising the means for creating substantially linear voltage gradients within said resistor grid array when the corner voltages are applied to said corner voltage terminals and for applying a separate waveguide control voltage to each of said control voltage electrodes such that the resulting voltage pattern of the transverse voltages applied individually across each of said waveguides is substantially linear along any row and any column in said emitting array, and which resistor grid array comprises the following elements electrically connected together in a grid:
said corner voltage terminals;
a multiplicity of row resistor elements all of substantially the same resistance; and
a multiplicity of column resistor elements all of substantially the same resistance, which resistance is much lower than that of said row resistor elements, in order to minimize deviations from linearity in the planar voltage distribution pattern; and d) said base bias grid comprising the means for applying the base bias voltage to all said base voltage electrodes.

2. The apparatus of claim 1, wherein the polarized coherent light source is received at the input end of said waveguide bundle at substantially the same phase angle across the input end.

3. The apparatus of claim 1, wherein the corner voltages consist of a reference control voltage and three analog control voltages and wherein the reference control voltage is grounded to the same electrical ground as said electronic control circuit.

4. The apparatus of claim 1, wherein the base bias voltage is grounded to the same electrical ground as said electronic control circuit.

5. The apparatus of claim 1, wherein the corner voltages consist of a reference control voltage and three analog control voltages and wherein said electronic control circuit comprises the means for:
a) grounding both the reference control voltage and the base bias voltage to the electrical ground of said electronic control circuit; and
b) converting the two input control signals into the three analog control voltages, referred to as the second, third and fourth corner voltages, in such a way that:
the second corner voltage is substantially proportional to the first input control signal;
the third corner voltage is substantially proportional to the second input control signal; and
the fourth corner voltage is substantially equal to the sum of the second corner voltage and the third corner voltage.

6. The apparatus of claim 1 wherein the corner voltages consist of a reference control voltage and three analog control voltages and wherein said electronic control circuit comprises the means for applying a reverse tilt to the planar voltage distribution pattern, thereby permitting the scanning range to extend to all four quadrants of a projection plane, by:
a) grounding the base bias voltage to the electrical ground of said electronic control circuit;
b) converting the two input control signals into a first intermediate signal and a second intermediate signal such that:
the first intermediate signal is substantially proportional to the amount by which the first input control signal differs from the midpoint of its operating range, and
the second intermediate signal is substantially proportional to the amount by which the second input control signal differs from the midpoint of its operating range;
c) deriving one of three values for the reference control voltage depending on the relative values of the first intermediate signal and the second intermediate signal; and
d) converting the first intermediate signal, the second intermediate signal and the reference control voltage into the three analog control voltages, referred to as the second, third and fourth corner voltages, in such a way that:
the second corner voltage is substantially equal to the sum of the reference control voltage and the first intermediate signal;
the third corner voltage is substantially equal to the sum of the reference control voltage and the second intermediate signal; and
the fourth corner voltage is substantially equal to the sum of the reference control voltage, the first intermediate signal and the second intermediate signal.

7. The apparatus of claim 1, wherein said electronic control circuit comprises a programmable controller programmed to convert the two input control signals into the corner voltages.

8. The apparatus of claim 7, wherein said programmable controller comprises the means for receiving the two input control signals in a digital form.

9. The apparatus of claim 7, wherein said programmable controller comprises the means for applying a reverse tilt to the planar voltage distribution pattern, thereby permitting the scanning range to extend to all four quadrants of a projection plane.

10. The apparatus of claim 7, wherein said programmable controller comprises the means for applying trigonometric error compensation to the corner voltages.

11. The apparatus of claim 1, wherein said electronic control circuit comprises the means for receiving two continuously variable input control signals and converting them in such a way that the output beam can be controlled continuously over its operating range.

12. The apparatus of claim 1, wherein said electronic control circuit comprises the means for receiving two independently variable input control signals and converting them in such a way that the movement of the output beam in the direction of one axis of a projection plane is substantially independent of its movement along the other axis.

13. The apparatus of claim 1, wherein said electronic control circuit is fabricated on to an end of a waveguide assembly, which waveguide assembly comprises said waveguide bundle and an outer casing surrounding said waveguide bundle.

14. The apparatus of claim 1, wherein said resistor grid array is fabricated on to an end of a waveguide assembly, which waveguide assembly comprises said waveguide bundle and an outer casing surrounding said waveguide bundle.

15. The apparatus of claim 1, wherein said base bias grid is fabricated on to an end of a waveguide assembly, which waveguide assembly comprises said waveguide bundle and an outer casing surrounding said waveguide bundle.

16. The apparatus of claim 1, wherein said phase modulator elements are essentially parallel to one another and are embedded in a solid matrix structure.

17. The apparatus of claim 1, wherein the entire apparatus is an integrated solid state device.

18. The apparatus of claim 1, wherein said waveguide comprises a central core of substantially circular cross-section.

19. The apparatus of claim 1, wherein said waveguide comprises a central core of substantially hexagonal cross-section.

20. The apparatus of claim 1, wherein said electro-optical material of said waveguide is comprised of lead lanthanum zirconate titanate.

21. The apparatus of claim 20, wherein said lead lanthanum zirconate titanate includes trace amounts of barium and strontium as stabilizing agents.

22. The apparatus of claim 1, wherein said electro-optical material of said waveguide is comprised of lead lanthanum stannate zirconate titanate.

23. The apparatus of claim 22, wherein said lead lanthanum stannate zirconate titanate includes trace amounts of barium and strontium as stabilizing agents.

24. The apparatus of claim 1, wherein said phase modulator elements further include a non-reflective coating at their emitting ends.

25. The apparatus of claim 1 wherein said emitting array is a two dimensional emitting array.

26. The apparatus of claim 25, wherein operable emitting elements of said emitting array form a hexagonal shape.

27. The apparatus of claim 1, wherein said emitting array is a rectangular emitting array with m number of rows and n number of columns.

28. The apparatus of claim 27, wherein:
the number of rows is equal to the number of columns;
said emitting array is a square emitting array; and
said resistor grid array is a square resistor grid array.

29. The apparatus of claim 27, wherein:
the number of rows is equal to the number of columns;
said emitting array is an offset square emitting array; and
said resistor grid array is an offset square resistor grid array and further includes half value row resistor elements.

30. The apparatus of claim 1, wherein the phase modular elements are substantially identical to one another.

31. The apparatus of claim 1, wherein the intensity of the polarized coherent light source is substantially the same across the input end of said waveguide bundle.

32. The apparatus of claim 1, which further includes an attenuating filter located at an end of said waveguide bundle, said attenuating filter comprising the means for modifying the effective shape of the emitting array by attenuating the light passing through said attenuating filter according to a predetermined attenuation pattern across its surface.

33. The apparatus of claim 1, wherein the electrical connection between said resistor grid array and each of said control voltage electrodes further includes the means for amplifying the electrical signal between said resistor grid array and each of said control voltage electrodes.

34. An apparatus for producing, from a polarized coherent light source, an output beam which can be steered in two dimensions by means of two input control signals, comprising:

a) a waveguide stack with an input end and an emitting end, comprising:

a plurality of similar planar phase modulator elements, stacked on top of one another so as to form said waveguide stack, each of which planar phase modulator elements comprises:

a planar thin film waveguide of an electro-optical material;

a longitudinal input port at the input end of said planar thin film waveguide to receive the polarized coherent light;

a longitudinal emitting element at the emitting end of said planar thin film waveguide to allow phase shifted light to emerge;

a planar control voltage electrode, the opposite sides of which are each electrically connected to opposite points of a resistor grid array; and a planar base voltage electrode electrically connected to a base bias grid;

said planar control voltage electrode and said planar base voltage electrode running along opposite surfaces of said planar thin film waveguide and comprising the means for applying a linearly varying transverse voltage across said planar thin film waveguide, by which, linearly varying phase shifts in the light passing through said planar thin film waveguide are induced, which phase shifts at any point along said longitudinal emitting element are proportional to the magnitude of the linearly varying transverse voltage at that point and the effective length over which the linearly varying transverse voltage is applied; and an emitting array at the emitting end comprising a linear array of said longitudinal emitting elements, from which the output beam is produced by the interference of the emerging phase shifted light;

b) an electronic control circuit comprising the means for receiving the two input control signals, providing a base bias voltage and producing four corner voltages, which four corner voltages are interrelated in such a way that when said four corner voltages are applied across four corner voltage terminals of said resistor grid array, said four corner voltages produce a substantially planar voltage distribution pattern of the transverse voltages across the surface of said emitting array, the orientation of which substantially planar voltage distribution pattern is consistent with the required direction of the output beam defined by the two input control signals;

c) said resistor grid array comprising the means for creating substantially linear voltage gradients within two columns of said resistor grid array when the four corner voltages are applied to said four corner voltage terminals and for applying separate waveguide control voltages to side electrodes on opposite sides of each of said planar control voltage electrodes, and which resistor grid array comprises the following elements electrically connected together in a grid:

said corner voltage terminals;

a multiplicity of column resistor elements arranged in said two columns, which column resistor elements are all of substantially the same resistance, which resistance, in order to minimize deviations from linearity in the planar voltage distribution pattern, is much lower than the resistance of each of said planar control voltage electrodes between the side electrodes on opposite sides of each of said planar control voltage electrodes; and d) said base bias grid comprising the means for applying the base bias voltage to all said planar base voltage electrodes.

35. An apparatus for producing, from a polarized coherent light source, an output beam which can be steered in two dimensions by means of a multiplicity of separate transverse voltages received from a control and distribution circuit, comprising a waveguide bundle with an input end and an output end, which waveguide bundle comprises:
   a) a multiplicity of similar phase modulator elements each of which comprises:
      a waveguide of an electro-optical material;
      an input port at the input end of said waveguide to receive the polarized coherent light;
      an emitting element at the emitting end of said waveguide to allow phase shifted light to emerge;
      a control voltage electrode comprising the means for receiving a waveguide control voltage from the control and distribution circuit; and
      a base voltage electrode comprising the means for receiving a base bias voltage from the control and distribution circuit;
      said control voltage electrode and said base voltage electrode running along the length of said waveguide and comprising the means for applying the transverse voltage, across said waveguide, by which a phase shift in the light passing through said waveguide is induced proportional to the magnitude of the transverse voltage and the effective length over which the transverse voltage is applied; and
   b) an emitting array at the emitting end comprising a regular array formed from said emitting elements, from which the output beam is produced by the interference of the emerging phase shifted light.

36. The apparatus of claim 35, wherein the phase modular elements are substantially identical to one another.

37. A control and distribution circuit, for producing a multiplicity of separate transverse voltages from two input control signals and distributing the transverse voltages individually across the waveguide of each of a multiplicity of similar phase modulator elements of a waveguide bundle, in order to steer an output beam produced by said waveguide bundle from a polarized coherent light source, comprising:
   a) an electronic control circuit comprising the means for receiving the two input control signals. providing a base bias voltage and producing four corner voltages, which corner voltages are interrelated in such a way that when said four corner voltages are applied across four corner voltage terminals of a resistor grid array said four corner voltages produce a substantially planar voltage distribution pattern of the transverse voltages across an emitting array of said waveguide bundle, the orientation of which substantially planar voltage distribution pattern is consistent with the required direction of the output beam defined by the two input control signals;
   b) said resistor grid array comprising the means for creating substantially linear voltage gradients within said resistor grid array when the corner voltages are applied to said corner voltage terminals and for applying a separate waveguide control voltage to the control voltage electrode of each of said phase modulator elements such that the resulting voltage pattern of the transverse voltages applied individually across each of said waveguides is substantially linear along any row and any column in said emitting array, and which resistor grid array comprises the following elements electrically connected together in a grid:
      said corner voltage terminals;
      a multiplicity of row resistor elements all of substantially the same resistance; and
      a multiplicity of column resistor elements all of substantially the same resistance, which resistance is much lower than that of said row resistor elements, in order to minimize deviations from linearity in the planar voltage distribution pattern; and
   c) a base bias grid comprising the means for applying the base bias voltage to all base voltage electrodes of said phase modulator elements.

38. The apparatus of claim 37, wherein the corner voltages consist of a reference control voltage and three analog control voltages and wherein the reference control voltage is grounded to the same electrical ground as said electronic control circuit.

39. The apparatus of claim 37, wherein the base bias voltage is grounded to the same electrical ground as said electronic control circuit.

40. The apparatus of claim 37, wherein the corner voltages consist of a reference control voltage and three analog control voltages and wherein said electronic control circuit comprises the means for:
   a) grounding both the reference control voltage and the base bias voltage to the electrical ground of said electronic control circuit; and
   b) converting the two input control signals into the three analog control voltages, referred to as the second, third and fourth corner voltages, in such a way that:
      the second corner voltage is substantially proportional to the first input control signal;
      the third corner voltage is substantially proportional to the second input control signal; and
      the fourth corner voltage is substantially equal to the sum of the second corner voltage and the third corner voltage.

41. The apparatus of claim 37, wherein the corner voltages consist of a reference control voltage and three analog control voltages and wherein said electronic control circuit comprises the means for applying a reverse tilt to the planar voltage distribution pattern, thereby permitting the scanning range to extend to all four quadrants of a projection plane, by:
   a) grounding the base bias voltage to the electrical ground of said electronic control circuit;
   b) converting the two input control signals into a first intermediate signal and a second intermediate signal such that:
      the first intermediate signal is substantially proportional to the amount by which the first input control signal differs from the midpoint of its operating range, and
      the second intermediate signal is substantially proportional to the amount by which the second input control signal differs from the midpoint of its operating range;
   c) deriving one of three values for the reference control voltage depending on the relative values of the first intermediate signal and the second intermediate signal; and
   d) converting the first intermediate signal, the second intermediate signal and the reference control voltage into the three analog control voltages, referred to as the second, third and fourth corner voltages, in such a way that:
      the second corner voltage is substantially equal to the sum of the reference control voltage and the first intermediate signal;
      the third corner voltage is substantially equal to the sum of the reference control voltage and the second intermediate signal; and the fourth corner voltage is substantially equal to the sum of the reference control voltage, the first intermediate signal and the second intermediate signal.

42. The apparatus of claim 37, wherein said electronic control circuit comprises a programmable controller programmed to convert the two input control signals into the corner voltages.

43. The apparatus of claim 42, wherein said programmable controller comprises the means for receiving the two input control signals in a digital form.

44. The apparatus of claim 42, wherein said programmable controller comprises the means for applying a reverse tilt to the planar voltage distribution pattern, thereby permitting the scanning range to extend to all four quadrants of a projection plane.

45. The apparatus of claim 42, wherein said programmable controller comprises the means for applying trigonometric error compensation to the corner voltages.

46. The apparatus of claim 37, wherein the electrical connection between said resistor grid array and each of said control voltage electrodes further includes the means for amplifying the electrical signal between said resistor grid array and each of said control voltage electrodes.

47. An apparatus for producing, from a polarized coherent light source, an output beam which can be steered in one dimension by means of one input control signal, comprising:
   a) a waveguide bundle with an input end and an emitting end, comprising:
      a multiplicity of similar phase modulator elements each of which comprises:
         a waveguide of an electro-optical material;
         an input port at the input end of said waveguide to receive the polarized coherent light;
         an emitting element at the emitting end of said waveguide to allow phase shifted light to emerge;
         a control voltage electrode electrically connected to a resistor grid array; and
         a base voltage electrode electrically connected to a base bias grid;
         said control voltage electrode and said base voltage electrode running along the length of said waveguide and comprising the means for applying a transverse voltage across said waveguide, by which a phase shift in the light passing through said waveguide is induced proportional to the magnitude of the transverse voltage and the effective length over which the transverse voltage is applied; and
      an emitting array at the emitting end comprising a regular array formed from said emitting elements, from which the output beam is produced by the interference of the emerging phase shifted light;
   b) an electronic control circuit comprising the means for receiving the input control signal, providing a base bias voltage and producing two corner voltages, which two corner voltages consist of a reference control voltage and an analog control voltage, which are interrelated in such a way that when the two corner voltages are applied across two corner voltage terminals of said resistor grid array, said two corner voltages produce a substantially planar voltage distribution pattern of the transverse voltages across said emitting array, the orientation of which substantially planar voltage distribution pattern is consistent with the required direction of the output beam defined by the input control signal;
   c) said resistor grid array comprising the means for creating substantially linear voltage gradients within said resistor grid array when the two corner voltages are applied to said two corner voltage terminals and for applying a separate waveguide control voltage to each of said control voltage electrodes such that the resulting voltage pattern of the transverse voltages applied individually across each of said waveguides is substantially linear along any row and any column in said emitting array, and which resistor grid array comprises the following elements electrically connected together in a grid:
      said two corner voltage terminals; and
      a multiplicity of row resistor elements all of substantially the same resistance; and
   d) said base bias grid comprising the means for applying the base bias voltage to all said base voltage electrodes.

48. The apparatus of claim 47, wherein the phase modular elements are substantially identical to one another.

49. The apparatus of claim 47, wherein the reference control voltage is grounded to the same electrical ground as said electronic control circuit.

50. The apparatus of claim 47, wherein the base bias voltage is grounded to the same electrical ground as said electronic control circuit.

51. The apparatus of claim 47, wherein said electronic control circuit comprises the means for:
   a) grounding both the reference control voltage and the base bias voltage to the electrical ground of said electronic control circuit; and
   b) converting the input control signal into the analog control voltage in such a way that the analog control voltage is substantially proportional to the input control signal.

52. The apparatus of claim 47, wherein said electronic control circuit comprises the means for applying a reverse tilt to the planar voltage distribution pattern, thereby permitting the scanning range to extend to two quadrants of a projection plane, by:
   a) grounding the base bias voltage to the electrical ground of said electronic control circuit,
   b) converting the input control signal into the analog control voltage in such a way that the analog control voltage is substantially proportional to the amount by which the input control signal differs from the midpoint of its operating range; and
   c) deriving one of two values for the reference control voltage depending on whether the amount by which the input control signal differs from the midpoint of its operating range is positive or negative.

53. An apparatus for producing, from a polarized coherent light source, an output beam which can be steered in one dimension by means of one input control signal, comprising:
   a) a waveguide stack with an input end and an emitting end, comprising at least one planar phase modulator element, which planar phase modulator element comprises:
      a planar thin film waveguide of an electro-optical material;
      a longitudinal input port at the input end of said planar thin film waveguide to receive the polarized coherent light;

a longitudinal emitting element at the emitting end of said planar thin film waveguide to allow phase shifted light to emerge, from which the output beam is produced by the interference of the emerging phase shifted light;

a planar control voltage electrode, the opposite sides of which are each electrically connected to an electronic control circuit; and a planar base voltage electrode electrically connected to a base bias grid;

said planar control voltage electrode and said planar base voltage electrode running along opposite surfaces of said planar thin film waveguide and comprising the means for applying a linearly varying transverse voltage across said planar thin film waveguide, by which, linearly varying phase shifts in the light passing through said planar thin film waveguide are induced, which phase shifts at any point along said longitudinal emitting element are proportional to the magnitude of the linearly varying transverse voltage at that point and the effective length over which the linearly varying transverse voltage is applied, b) an electronic control circuit comprising the means for receiving the input control signal, providing a base bias voltage and producing two corner voltages, which two corner voltages are interrelated in such a way that when said two corner voltages are applied to opposite sides of each of said planar control voltage electrodes, said two corner voltages produce a substantially linearly varying transverse voltage across said planar thin film waveguide, the gradient of which substantially linearly varying transverse voltage is consistent with the required direction of the output beam defined by the input control signal; and c) said base bias grid comprising the means for applying the base bias voltage to said planar base voltage electrode.

* * * * *